US012800963B2

(12) United States Patent
Tanaka

(10) Patent No.: US 12,800,963 B2
(45) Date of Patent: Nov. 17, 2026

(54) LIGHT SOURCE, LIGHTING DEVICE, AND DISPLAY DEVICE

(71) Applicant: Sharp Display Technology Corporation, Kameyama City (JP)

(72) Inventor: Atsuyuki Tanaka, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 318 days.

(21) Appl. No.: 18/614,882

(22) Filed: Mar. 25, 2024

(65) Prior Publication Data

US 2024/0361637 A1 Oct. 31, 2024

(30) Foreign Application Priority Data

Apr. 28, 2023 (JP) ................................ 2023-074861

(51) Int. Cl.
*G02F 1/1335* (2006.01)

(52) U.S. Cl.
CPC .............................. *G02F 1/133614* (2021.01)

(58) Field of Classification Search
CPC .. F21V 9/38; H10H 29/8513; H10H 20/8513; G02F 1/133614
See application file for complete search history.

(56) References Cited

U.S. PATENT DOCUMENTS 9,368,696 B1 * 6/2016 Murofushi ........... H10H 20/851
2006/0002678 A1 * 1/2006 Weber .................. G02B 6/0068 385/146
2008/0231162 A1 * 9/2008 Kurihara .................. F21V 9/32 313/487
2011/0211336 A1 * 9/2011 Oshio ....................... F21K 9/00 257/E33.059
2017/0194535 A1 * 7/2017 Park ..................... G02B 6/0015
2019/0198724 A1 * 6/2019 Amiya ............... H10H 20/8513
2019/0324327 A1 * 10/2019 Moon ............... G02F 1/133603
2021/0270443 A1 * 9/2021 Yun .................... H10H 20/8515

FOREIGN PATENT DOCUMENTS

JP 2005-063687 A 3/2005

* cited by examiner

*Primary Examiner* — Julie A Bannan
(74) *Attorney, Agent, or Firm* — ScienBiziP, P.C.

(57) ABSTRACT

A light source includes a first wavelength conversion portion including a first green fluorescent material to wavelength-convert light emitted by a first light-emitting element to green light in a green wavelength region and a first red fluorescent material to wavelength-convert the light emitted by the first light-emitting element to red light in a red wavelength region, and a second wavelength conversion portion including a second green fluorescent material to wavelength-convert light emitted by the second light-emitting element to the green light and a second red fluorescent material to wavelength-convert the light emitted by the second light-emitting element to the red light. The first wavelength conversion portion and the second wavelength conversion portion differ from each other in either one or both of a quantity and a composition of the first green fluorescent material, the first red fluorescent material, the second green fluorescent material, and the second red fluorescent material.

8 Claims, 12 Drawing Sheets

| | QUANTITY RATIO | SOLO LUMINESCENCE | VALUE OF x | VALUE OF y | DISTANCE |
|---|---|---|---|---|---|
| COMPARATIVE EXAMPLES 1 TO 3 AND EXAMPLES 1, 2 | 1~3 | SECOND LED ELEMENT | 0. 2830 | 0. 2970 | – |
| COMPARATIVE EXAMPLE 1 | 1 | FIRST LED ELEMENT | 0. 2900 | 0. 1986 | 0. 09865 |
| EXAMPLE 2 | 1. 1 | FIRST LED ELEMENT | 0. 2975 | 0. 2095 | 0. 08869 |
| EXAMPLE 1 | 1. 73 | FIRST LED ELEMENT | 0. 3338 | 0. 2623 | 0. 06151 |
| COMPARATIVE EXAMPLE 2 | 2. 98 | FIRST LED ELEMENT | 0. 3773 | 0. 3256 | 0. 09865 |
| COMPARATIVE EXAMPLE 3 | 3 | FIRST LED ELEMENT | 0. 3778 | 0. 3263 | 0. 09922 |

FIG. 14
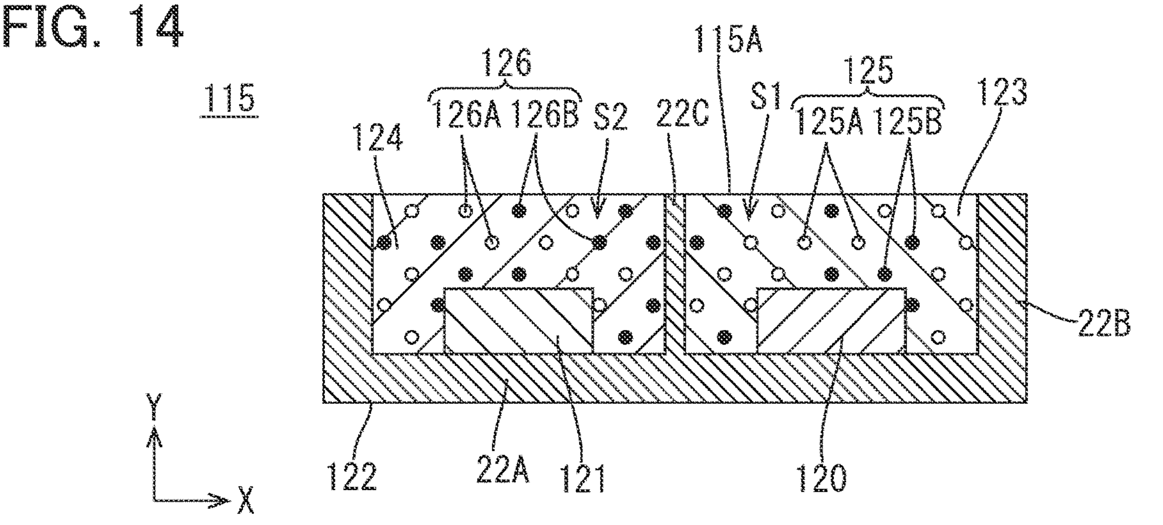
FIG. 15
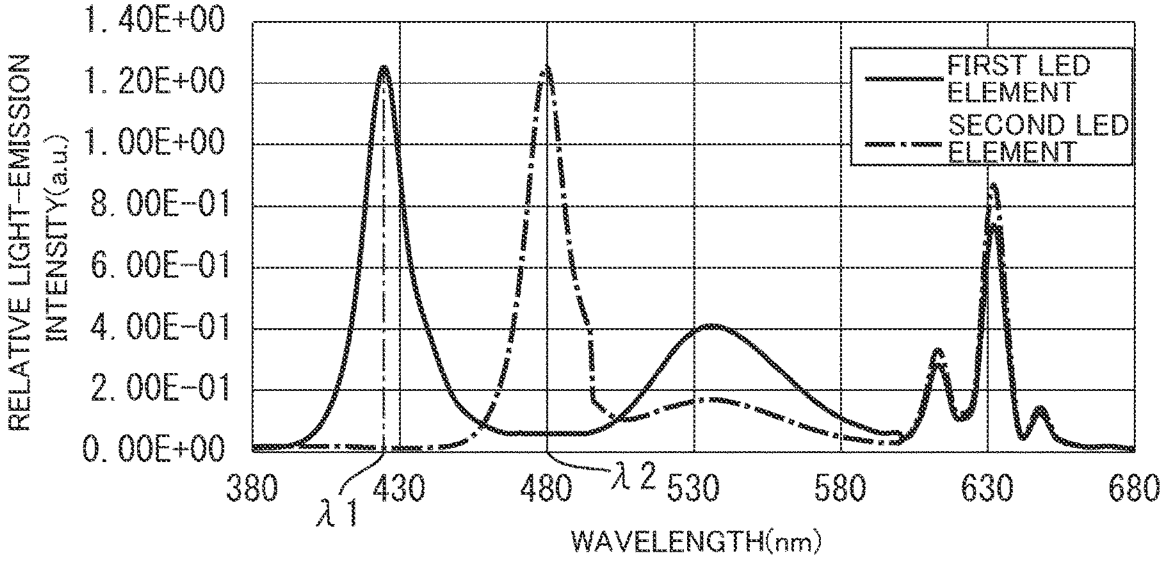
FIG. 16
| | PEAK INTENSITY | |
|---|---|---|
| | FIRST LED ELEMENT | SECOND LED ELEMENT |
| BLUE LIGHT | 1.00 | 1.00 |
| GREEN LIGHT | 0.32 | 0.13 |
| RED LIGHT | 0.58 | 0.69 |

| | FIRST LED ELEMENT | SECOND LED ELEMENT |
|---|---|---|
| G/R RATIO | 0. 55 | 0. 19 |
| R/G RATIO | 1. 81 | 5. 31 |

LIGHT SOURCE, LIGHTING DEVICE, AND DISPLAY DEVICE

FIELD OF THE INVENTION

The present specification discloses technology related to light sources, lighting devices, and display devices.

BACKGROUND OF THE INVENTION

Patent Literature 1 listed below describes a known example of a lighting device and a light source included in a display device. Patent Literature 1 describes a light-emitting device as a lighting device and an LED as a light source. The light-emitting device described in Patent Literature 1 includes a plurality of red light-emitting LEDs 103, a plurality of green light-emitting LEDs 104, a plurality of blue light-emitting LEDs 105 with a peak emission wavelength of 470 nm, and a plurality of blue light-emitting LEDs 106 with a peak wavelength shorter than that of the LEDs 105. The LEDs 105 emit blue light that could affect biological rhythm by restraining melatonin. The LEDs 106 emit blue light that has a lower melatonin-restraining effect because of their shorter wavelengths than the blue light emitted by the LEDs 105. The light-emitting device is described as being capable of regulating biological rhythm effectively in accordance with the situation, by a control circuit 107 switching between the illumination by the LEDs 105 and the illumination by the LEDs 106.

CITATION LIST

Patent Literature

Patent Literature 1: Japanese Unexamined Patent Application Publication No. 2005-63687

SUMMARY

Problems to Be Solved by the Disclosure

The light-emitting device described in Patent Literature 1 listed above include the LEDs 105 that emit blue light with a peak emission wavelength of 470 nm and the LEDs 106 that emit blue light with a peak wavelength shorter than 470 nm. The LEDs 105, 106 have different peak wavelengths and therefore produce an undesirable color tone difference that may be easily visually recognized.

The technology described in the present specification has been completed in these circumstances and has an object to render color tone differences less visually recognizable.

Solution to the Problems (1) A light source related to the technology described in the present specification includes: a first light-emitting element having a primary emission wavelength equal to a first wavelength that is in a blue wavelength region; a second light-emitting element having a primary emission wavelength equal to a second wavelength that is in the blue wavelength region, the second wavelength being longer than the first wavelength; a first wavelength conversion portion disposed on a light-exiting side of the first light-emitting element; and a second wavelength conversion portion disposed on a light-exiting side of the second light-emitting element, wherein the first wavelength conversion portion includes: a first green fluorescent material configured to wavelength-convert light emitted by the first light-emitting element to green light in a green wavelength region; and a first red fluorescent material configured to wavelength-convert the light emitted by the first light-emitting element to red light in a red wavelength region, the second wavelength conversion portion includes: a second green fluorescent material configured to wavelength-convert light emitted by the second light-emitting element to the green light; and a second red fluorescent material configured to wavelength-convert the light emitted by the second light-emitting element to the red light, and the first wavelength conversion portion and the second wavelength conversion portion differ from each other in either one or both of a quantity and a composition of the first green fluorescent material, the first red fluorescent material, the second green fluorescent material, and the second red fluorescent material.

(2) The light source may be configured as in (1) above and further such that a quantity of the first green fluorescent material and the first red fluorescent material is greater than a quantity of the second green fluorescent material and the second red fluorescent material.

(3) The light source may be configured as in (2) above and further such that a ratio of the quantity of the first green fluorescent material and the first red fluorescent material to the quantity of the second green fluorescent material and the second red fluorescent material is greater than 1 and smaller than 2.98.

(4) The light source may be configured as in any one of (1) to (3) above and further such that a ratio in quantity of the first green fluorescent material to the first red fluorescent material is greater than a ratio in quantity of the second green fluorescent material to the second red fluorescent material.

(5) The light source may be configured as in any one of (1) to (4) above and further so as to include: a housing portion housing the first light-emitting element and the second light-emitting element; a first sealing portion filling the housing portion to seal the first light-emitting element; and a second sealing portion filling the housing portion to seal the second light-emitting element, wherein the first wavelength conversion portion is contained in the first sealing portion, and the second wavelength conversion portion is contained in the second sealing portion.

(6) The light source may be configured as in (5) above and further such that the first sealing portion has a same concentration of the first green fluorescent material and the first red fluorescent material as the second sealing portion has a concentration of the second green fluorescent material and the second red fluorescent material, and the first sealing portion has a greater fill amount than the second sealing portion.

(7) The light source may be configured as in (5) above and further such that the first wavelength conversion portion and the second wavelength conversion portion differ from each other in the composition of the first green fluorescent material, the first red fluorescent material, the second green fluorescent material, and the second red fluorescent material, and the first sealing portion and the second sealing portion have an equal fill amount.

(8) The light source may be configured as in any one of (5) to (7) above and further such that the housing portion includes a partition wall dividing the first sealing portion and the second sealing portion.

(9) The light source may be configured as in (8) above and further such that the housing portion includes: a bottom portion supporting the partition wall; and a peripheral wall rising from the bottom portion to surround the first sealing portion and the second sealing portion, the peripheral wall is shaped like a rectangular frame in a plan view, the partition wall is provided extending along a diagonal of the peripheral wall, and the first light-emitting element and the second light-emitting element are both elongated and disposed so as to have a lengthwise direction thereof parallel to the partition wall.

(10) The light source may be configured as in any one of (1) to (9) above and further such that the first wavelength for the first light-emitting element is in a range of from 420 nm to 450 nm, and the second wavelength for the second light-emitting element is in a range of from 450 nm to 480 nm.

(11) A lighting device related to the technology described in the present specification includes: the light source of any one of (1) to (10) above; and an optical member disposed on a light-exiting side of the light source to impart an optical effect on light emitted by the light source.

(12) The lighting device may be configured as in (11) above and further such that the optical member includes a light-guide plate having a light-incident end face opposite a light-emitting face of the light source, the light-guide plate being configured to guide light from the light source, and the light source includes a plurality of light sources arranged along the light-incident end face.

(13) A display device related to the technology described in the present specification includes: the lighting device of one of (11) and (12) above; and a display panel configured to produce a display by using light from the lighting device.

Advantageous Effects of the Invention

The technology described in the present specification is capable of rendering color tone differences less visually recognizable.

BRIEF DESCRIPTION OF DRAWINGS

FIG. 14 is a cross-sectional view of an LED in accordance with Embodiment 2.

FIG. 15 is a graph representing a light emission spectrum of an LED (first and second LED elements) in accordance with Embodiment 2.

FIG. 16 is a table showing the peak intensities of blue light, green light, and red light in the light emission spectrum of an LED in accordance with Embodiment 2.

DESCRIPTION OF EMBODIMENTS

Embodiment 1

Embodiment 1 will be described with reference to FIGS. 1 to 13. The present embodiment discusses a liquid crystal display device (display device) 10 as an example. Note that each drawing shows, in a portion thereof, an X-axis, a Y-axis, and a Z-axis drawn so that the direction of each axis is the direction indicated in each drawing. In addition, the vertical direction is based on FIGS. 1 and 2, with the upper side of FIGS. 1 and 2 representing the front side and the lower side of FIGS. 1 and 2 representing the back side.

Figure 1:
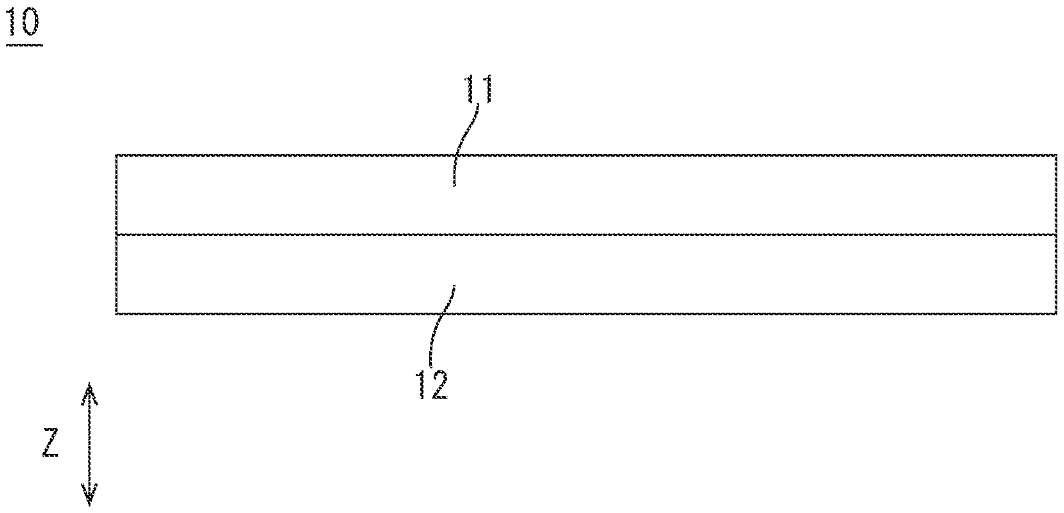
FIG. 1 is a schematic side view of a liquid crystal display device in accordance with Embodiment 1.

Referring to FIG. 1, the liquid crystal display device 10 includes: a liquid crystal panel (display panel) 11 for displaying an image; and a backlight device (lighting device) 12, disposed on the back side (rear face side) of the liquid crystal panel 11, for projecting light for a display onto the liquid crystal panel 11. The liquid crystal panel 11 and the backlight device 12 are stacked front to back and held in place by a prescribed holding member.

Figure 2:
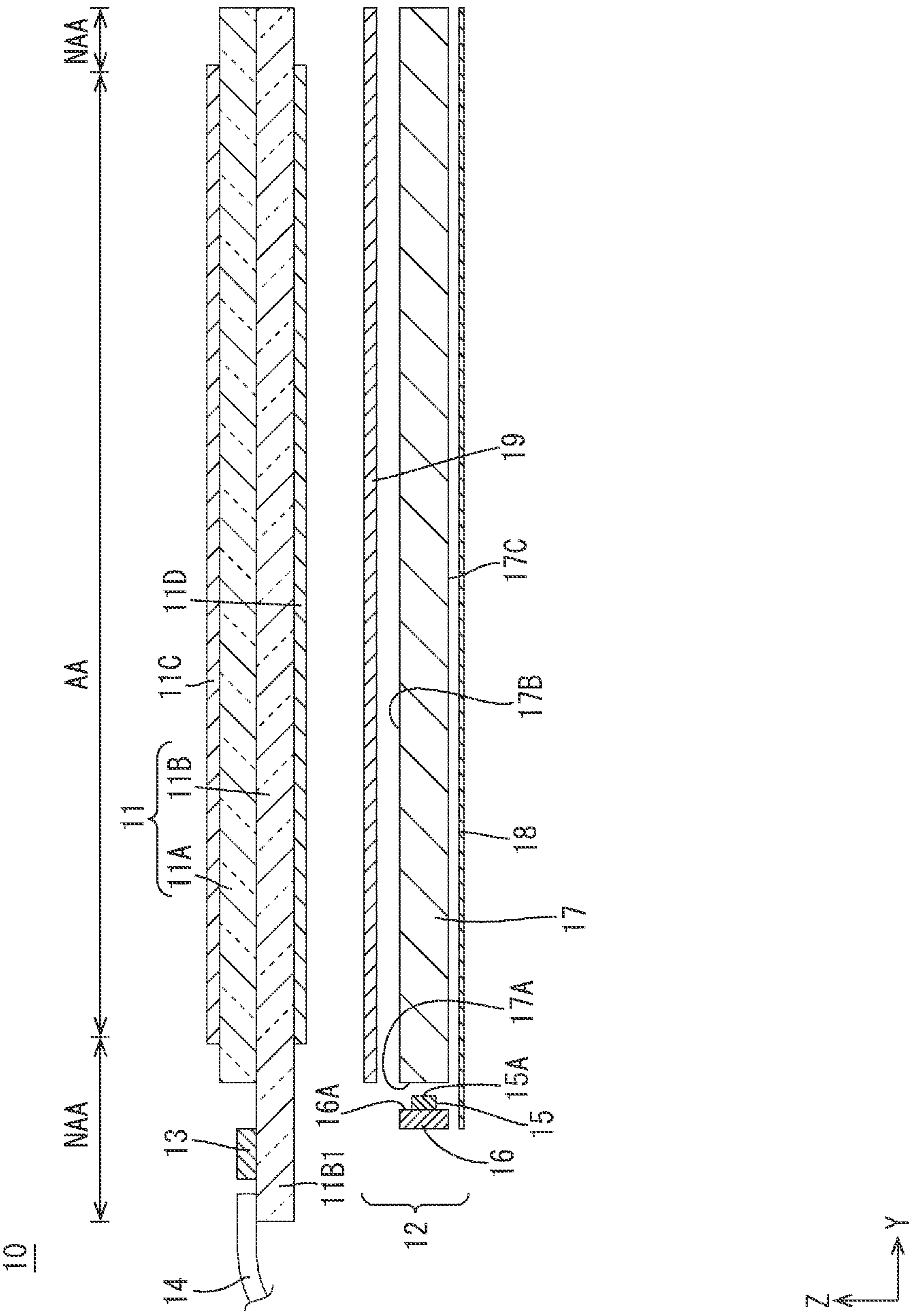
FIG. 2 is a cross-sectional view of a liquid crystal panel and a backlight device included in the liquid crystal display device in accordance with Embodiment 1.

The liquid crystal panel 11 is provided on the front side (light-exiting side) of the backlight device 12 as shown in FIG. 2. The liquid crystal panel 11 includes a pair of substrates 11A, 11B attached together and a liquid crystal layer enclosed between the pair of substrates 11A, 11B. Of the pair of substrates 11A, 11B, the front side (front face side) is the opposite substrate 11A, the back side (rear face side) is the array substrate 11B. Note that the opposite substrate 11A and the array substrate 11B each have an inner face having an alignment film thereon. In addition, the opposite substrate 11A and the array substrate 11B each have an outer face having a polarizer 11C, 11D.

Referring to FIG. 2, the liquid crystal panel 11 has a primary face a central portion of which provides a display area AA where images are displayed and a circumferential portion of which, enclosing the display area AA, is a non-display area NAA where no images are displayed. The array substrate 11B is larger in size than the opposite substrate 11A and includes a protrusion portion 11B1 protruding sideways from the opposite substrate 11A. The protrusion portion 11B1 is not covered by the opposite substrate 11A and hence exposed. The protrusion portion 11B1 is entirely a part of the non-display area NAA and includes, mounted thereon, a driver 13 for feeding various signals and a flexible substrate 14.

The backlight device 12 is described next. Referring to FIG. 1, the backlight device 12 projects light for use in producing displays onto the liquid crystal panel 11. Referring to FIG. 2, the backlight device 12 includes at least: LEDs (light sources) 15; an LED board (light source substrate) 16 on which the LED 15 is disposed; a light-guide plate (optical member) 17 for guiding light from the LED 15; a reflective sheet (reflection member) 18 disposed on the back side of the light-guide plate 17; and a plurality of optical sheets (optical members) 19 interposed between the light-guide plate 17 and the liquid crystal panel 11. The backlight device 12 is an edge-lit backlight device of a single-side-light-incident type in which light from the LED 15 is incident only to one of two sides of the light-guide plate 17.

The LEDs 15 are mounted on the surface of the LED board 16 as shown in FIG. 2. The LEDs 15 are a "top-emission type" in which a light-emitting face 15A through which light is discharged faces opposite the LED board 16 side (front side, light-guide plate 17 side). Each LED 15 has an optical axis matched with the Y-axis direction. The "optical axis" here is the axis that matches the traveling direction of the light, out of the light emitted by the LED 15, that has the highest (peak) light-emission intensity. In the present embodiment, the LED 15 is a white LED that emits white light and hence as a whole appears white. The structure of the LED 15 will be described later in detail.

Figure 3:
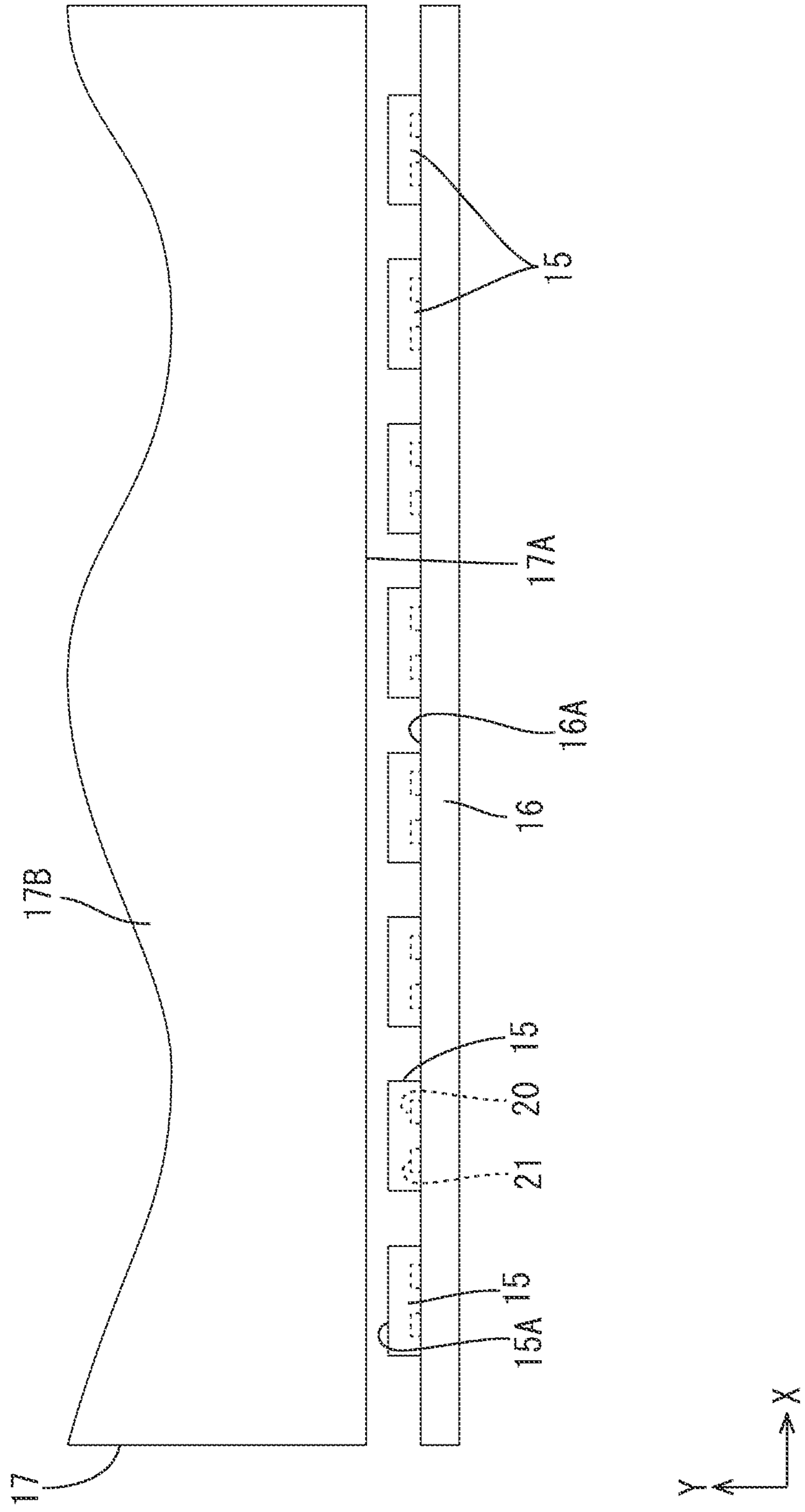
FIG. 3 is a plan view of LEDs, an LED board, and a light-guide plate, all included in the backlight device in accordance with Embodiment 1.

The LED board 16 includes: a base member made of a synthetic resin material; and a metal foil of, for example, copper in which numerous wiring patterns are formed, the metal foil being stacked on the base member. Referring to FIG. 2, the LED board 16 is shaped like a plate or film having a primary face orthogonal to the primary face of the liquid crystal panel 11. The LED board 16 is disposed so that one of the two primary faces thereof faces an end face (light-incident end face 17A detailed later) of the light-guide plate 17. The LED board 16 is shaped like an elongated band extending in the lengthwise direction (X-axis direction) of the end face of the light-guide plate 17. The LED 15 is mounted on the primary face of the LED board 16 that faces the light-guide plate 17, and this surface provides a mounting face 16A. Referring to FIG. 3, the plurality of LEDs 15 are arranged in a single direction on the mounting face 16A of the LED board 16. The arrangement direction of the plurality of LEDs 15 matches the lengthwise direction (X-axis direction) of the mounting face 16A. FIG. 3 shows eight LEDs 15 as an example. The specific number of LEDs 15 in a single row may not be eight. The plurality of LEDs 15 are arranged along a straight line at substantially constant intervals to form a single row in the X-axis direction.

The light-guide plate 17 is made of a substantially transparent synthetic resin material (e.g., an acrylic resin such as PMMA or a polycarbonate) and has a sufficiently higher refractive index than the refractive index of air. Referring to FIG. 2, the light-guide plate 17 is shaped like a plate and has a primary face parallel to the primary face of the liquid crystal panel 11. The light-guide plate 17 is disposed immediately below the liquid crystal panel 11 and the optical sheets 19. The light-guide plate 17 is disposed overlapping the display area AA of the liquid crystal panel 11.

Referring to FIG. 2, one of the circumferential end faces of the light-guide plate 17 located along the longer side forms the light-incident end face 17A facing the light-emitting faces 15A of the LEDs 15. The light-incident end face 17A is elongated sideways and parallel to the X-axis direction and the Z-axis direction and has the length direction thereof matched with the X-axis direction (the arrangement direction of the plurality of LEDs 15) and the width direction thereof matched with the Z-axis direction. In addition, the normal to the light-incident end face 17A matches the Y-axis direction. The light-incident end face 17A is directly hit by the light discharged through the light-emitting faces 15A of the LEDs 15. The front side one of a pair of primary faces of the light-guide plate 17 that faces the liquid crystal panel 11 and the optical sheets 19 forms a light-exiting primary face 17B through which the light having been guided therethrough exits. The back side one of the pair of primary faces of the light-guide plate 17 that faces the reflective sheet 18 forms an opposite primary face 17C. Then, the light-guide plate 17 has a function of introducing, through the light-incident end face 17A, the light emitted by the LEDs 15 toward the light-guide plate 17, propagating the introduced light therethrough, and thereafter discharging the light upward in the Z-axis direction toward the front side (light-exiting side).

Referring to FIG. 2, the reflective sheet 18 is disposed so as to have a primary face thereof parallel to the primary faces of, for example, the liquid crystal panel 11 and the light-guide plate 17 and as to cover the opposite primary face 17C of the light-guide plate 17. The reflective sheet 18 is highly reflective to light. The reflective sheet 18 is capable of reflecting the light leaking through the opposite primary face 17C of the light-guide plate 17 efficiently upward toward the front side, in other words, toward the light-exiting primary face 17B.

Referring to FIG. 2, each optical sheet 19 is shaped like a sheet and have a primary face thereof parallel to the primary faces of the liquid crystal panel 11 and the light-guide plate 17. The optical sheets 19 are interposed between the liquid crystal panel 11 and the light-guide plate 17 with respect to the Z-axis direction and sandwiched between the back-side primary face of the liquid crystal panel 11 and the light-exiting primary face 17B of the light-guide plate 17. The optical sheets 19 has for example, a function of imparting a prescribed optical effect to the light discharged through the light-exiting primary face 17B of the light-guide plate 17 and discharging that light toward the liquid crystal panel 11. There may be provided a single optical sheet 19 or alternatively a plurality of optical sheets 19. The optical sheets 19 may include, for example, a diffusion sheet for diffusing light, a prism sheet for converging light, or a reflective polarizer sheet.

Figure 4:
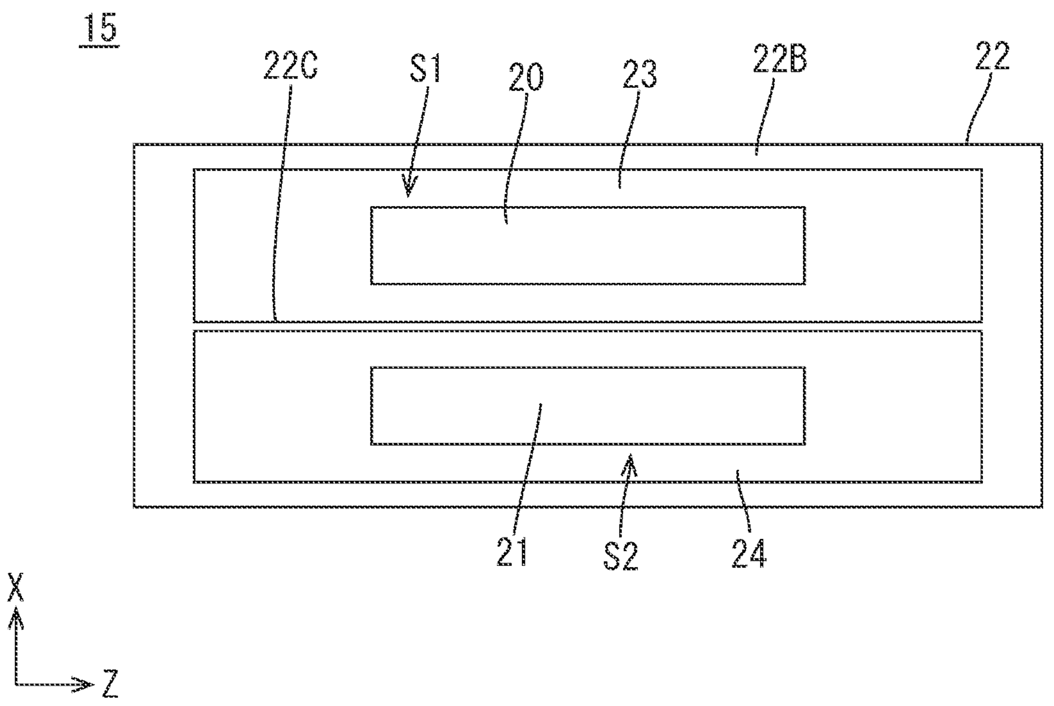
FIG. 4 is a front view of an LED in accordance with Embodiment 1.
Figure 5:
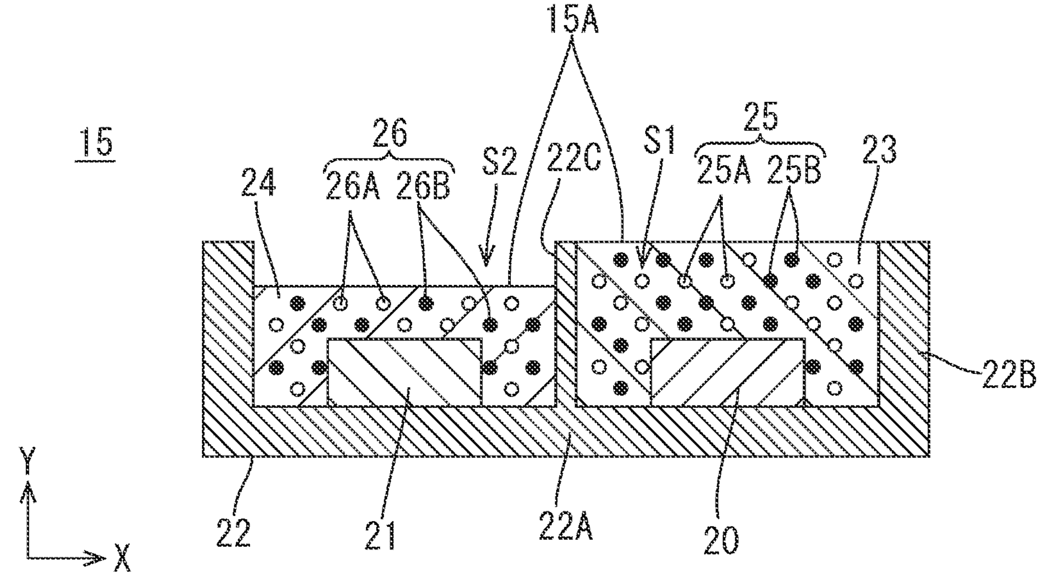
FIG. 5 is a cross-sectional view of an LED in accordance with Embodiment 1.

The structure of the LED 15 is described next in detail primarily with reference to FIGS. 4 and 5. Referring to FIGS. 4 and 5, the LED 15 includes: a first LED element (first light-emitting element) 20 and a second LED element (second light-emitting element) 21; a housing portion 22 for housing the two LED elements 20, 21; a first sealing portion 23 for filling the housing portion 22 and hence sealing the first LED element 20; and a second sealing portion 24 for filling the housing portion 22 and hence sealing the second LED element 21.

Referring to FIGS. 4 and 5, the housing portion 22 is shaped generally like a bottomed tube, with openings toward the front side, that overall appears like a rectangle in a plan view. The housing portion 22 includes: a bottom portion 22A; a peripheral wall 22B rising from a peripheral portion of the bottom portion 22A; and a partition wall 22C rising from the bottom portion 22A and contiguous to the peripheral wall 22B. The bottom portion 22A is shaped like a rectangle elongated sideways in a plan view. The peripheral wall 22B is shaped like a rectangular (tubular) frame elongated sideways in a plan view (when viewed from the light-emitting face 15A side). The partition wall 22C is shaped like a flat plate extending in the longer side direction (Z-axis direction) of the peripheral wall 22B and connects to a pair of shorter side portions of the peripheral wall 22B. The partition wall 22C partitions the internal space of the housing portion 22 into two spaces S1, S2 with respect to the shorter side direction (X-axis direction) of the peripheral wall 22B. The two LED elements 20, 21 are housed in the two spaces S1, S2 in the housing portion 22 partitioned by the partition wall 22C and arranged in the X-axis direction (see FIG. 3). The two LED elements 20, 21 are both elongated sideways like a rectangle and disposed so as to match the lengthwise direction thereof with the longer side direction of the peripheral wall 22B (direction in which the partition wall 22C is extended). The first sealing portion 23 and the second sealing portion 24 are both made of a highly transmissive resin material (e.g., an epoxy resin material or a silicone resin material). The first sealing portion 23 and the second sealing portion 24 fill the housing portion 22 to close the openings of the housing portion 22 and to form the light-emitting face 15A. The first sealing portion 23 fills the first space S1 where the first LED element 20 is housed in the housing portion 22 to seal the first LED element 20. The second sealing portion 24 fills the second space S2 where the second LED element 21 is housed in the housing portion 22 to seal the second LED element 21.

The first LED element 20 and the second LED element 21 are both a blue LED element for emitting monochromatic blue light in the blue wavelength region (approximately from 400 nm to approximately 500 nm). The first LED element 20 and the second LED element 21 have different primary emission wavelengths. More specifically, the first LED element 20 has a primary emission wavelength equal to a first wavelength λ1 that is in the blue wavelength region (see FIG. 6), whereas the second LED element 21 has a primary emission wavelength equal to a second wavelength λ2 that is in the blue wavelength region, but that is longer than the first wavelength λ1 (see FIG. 8). The first wavelength λ1, which is the primary emission wavelength of the first LED element 20, is, for example, 425 nm. The second wavelength λ2, which is the primary emission wavelength of the second LED element 21, is, for example, 480 nm. The first wavelength λ1 differs from the second wavelength λ2 by, for example, 55 nm.

Referring to FIG. 5, the LED 15 includes: a first wavelength conversion portion 25 for wavelength-converting part of the blue light emitted by the first LED element 20; and a second wavelength conversion portion 26 for wavelength-converting part of the blue light emitted by the second LED element 21. The first wavelength conversion portion 25 is contained in the first sealing portion 23 and disposed on the light-exiting side of the first LED element 20. The first wavelength conversion portion 25 wavelength-converts part of the blue light emitted by the first LED element 20 to light in the green to the red wavelength region. The first wavelength conversion portion 25 includes, as components thereof, a first green fluorescent material 25A for wavelength-converting blue light to green light in the green wavelength region (from approximately 500 nm to approximately 570 nm) and a first red fluorescent material 25B for wavelength-converting blue light to red light in the red wavelength region (from approximately 600 nm to approximately 780 nm). The first green fluorescent material 25A and the first red fluorescent material 25B are mixed and distributed at a prescribed concentration (distribution concentration) in the first sealing portion 23. The second wavelength conversion portion 26 is contained in the second sealing portion 24 and disposed on the light-exiting side of the second LED element 21. The second wavelength conversion portion 26 wavelength-converts part of the blue light emitted by the second LED element 21 to light in the green to the red wavelength region. The second wavelength conversion portion 26 includes, as components thereof, a second green fluorescent material 26A for wavelength-converting blue light to green light and a second red fluorescent material 26B for wavelength-converting blue light to red light. The second green fluorescent material 26A and the second red fluorescent material 26B are mixed and distributed at a prescribed concentration in the second sealing portion 24. Note that in FIG. 5, the first green fluorescent material 25A and the second green fluorescent material 26A are denoted by "○," and the first red fluorescent material 25B and the second red fluorescent material 26B are denoted by "•".

The first green fluorescent material 25A and the second green fluorescent material 26A are, for example, a fluorescent sialon material. The fluorescent sialon material includes a rare-earth element (e.g., Tb, Yg, Ag) as an activator. The fluorescent sialon material is, for example, beta-SiAlON. Beta-SiAlON is a solid solution of aluminum and oxygen in beta crystals of silicon nitride and represented by a general formula: $Si_{6-z}Al_zO_zN_{8-z}$ (z is a solid solution ratio) or $(Si,Al)_6(O,N)_8$. Beta-SiAlON includes, for example, Eu (europium), which is a rare-earth element, as an activator. The first red fluorescent material 25B and the second red fluorescent material 26B are, for example, a complex fluoride fluorescent material. The complex fluoride fluorescent material is represented by a general formula: $A_2MF_6$ (M is one or more of Si, Ti, Zr, Hf, Ge, and Sn, and A is one or more of Li, Na, K, Rb, and Cs). The complex fluoride fluorescent material is, for example, potassium silicofluoride ($K_2SiF_6$: Mn) containing manganese as an activator.

The LEDs 15, each structured as above, are connected to an external LED control circuit (light-source control circuit), so that the LED control circuit feeds power to, and controls the driving of, the LEDs 15. The LED control circuit is capable of feeding power to the first LED element 20 and the second LED element 21 in each LED 15 so as to control the light-emission quantity of the individual first and second LED elements 20 and 21. The LED control circuit controls the light-emission quantity of each of the first LED element 20 and the second LED element 21 by, for example, PWM (pulse width modulation) light modulation. Specifically, the LED control circuit controls the light-emission quantity per unit time of individual LEDs by supplying a pulse signal to each of the first LED element 20 and the second LED element 21 to adjust the time ratio of a light-ON period and a light-OFF period (non-light-ON period) (duty ratio) of each of the first LED element 20 and the second LED element 21.

Humans control periodic phenomena related to biological functions based on a timekeeping mechanism called the biological clock, and circadian rhythms are known as one of the periodic phenomena. Circadian rhythms are rhythms related to body temperature, hormone secretion, sleep and wakefulness, and other functions that are important for maintaining the body. The sleep-wake rhythm is closely related to melatonin secretion, which is suppressed during wakefulness. The amount of melatonin secreted is affected by light stimulation of the retina, and tends to depend on the wavelength of blue light, which belongs to the blue wavelength region of light. Specifically, melatonin secretion tends to be most suppressed when the retina is stimulated by blue light near 470 nm. Therefore, for example, if the retina is strongly stimulated by blue light near 470 nm at night and the secretion of melatonin is inhibited, the sleep-wake rhythm is likely to be disturbed and physical problems such as sleep disorders may develop.

In this regard, the LED control circuit described above makes it possible to properly adjust, for example, the light-emission quantity and ratio of the first LED element 20 and the second LED element 21 according to, for example, the period of the day (e.g., morning, noon, night, and late at night) and the time of day. Specifically, for example, in the morning, the LED control circuit turns off the first LED element 20 and turns on the second LED element 21 to suppress the secretion of melatonin in the user of the liquid crystal display device 10, thereby promoting wakefulness. On the other hand, for example, at night or late at night, the LED control circuit turns on the first LED element 20 and turns off the second LED element 21 to suppress the disturbance of the secretion of melatonin in the user of the liquid crystal display device 10, thereby promoting sleeping. As described here, the liquid crystal display device 10 in accordance with the present embodiment enables projecting light adapted for human circadian rhythms onto the liquid crystal panel 11 to produce an image display on the liquid crystal panel 11 by utilizing such light. Hence, the user of the liquid crystal display device 10 has his/her biological clock less likely to be disturbed, thereby less likely to develop physical problems such as sleep disorders.

Figure 6:
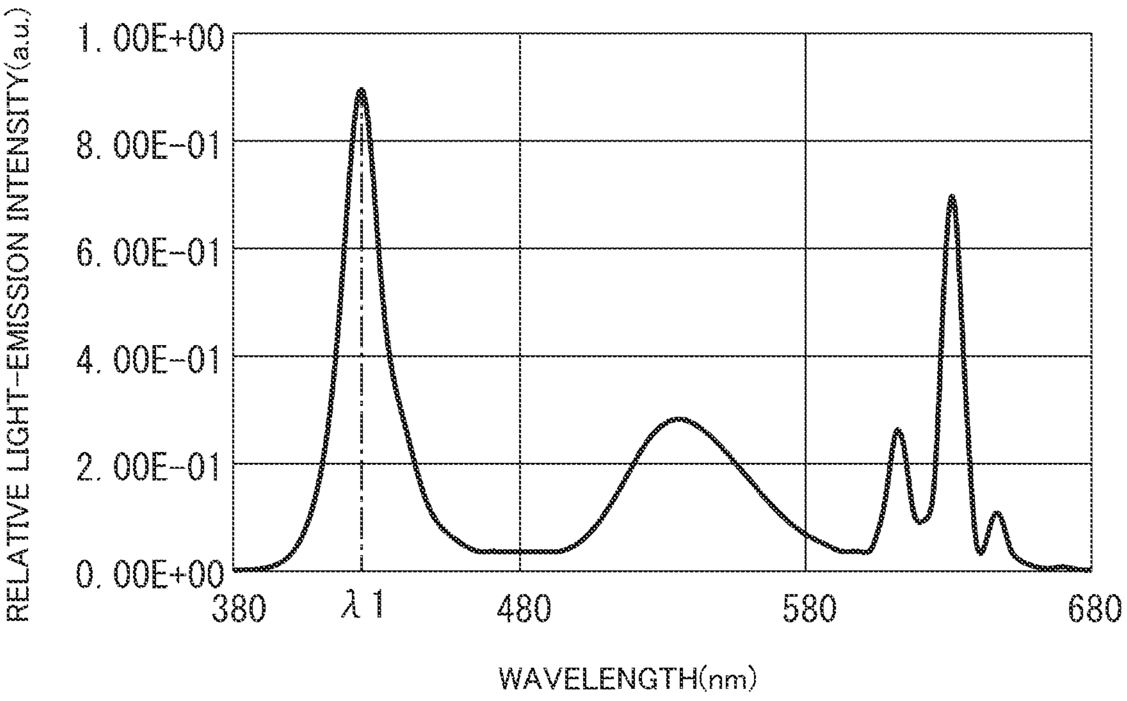
FIG. 6 is a graph representing a light emission spectrum of an LED when a first LED element in accordance with Embodiment 1 is turned on, and a second LED element in accordance with Embodiment 1 is turned off.
Figure 7:
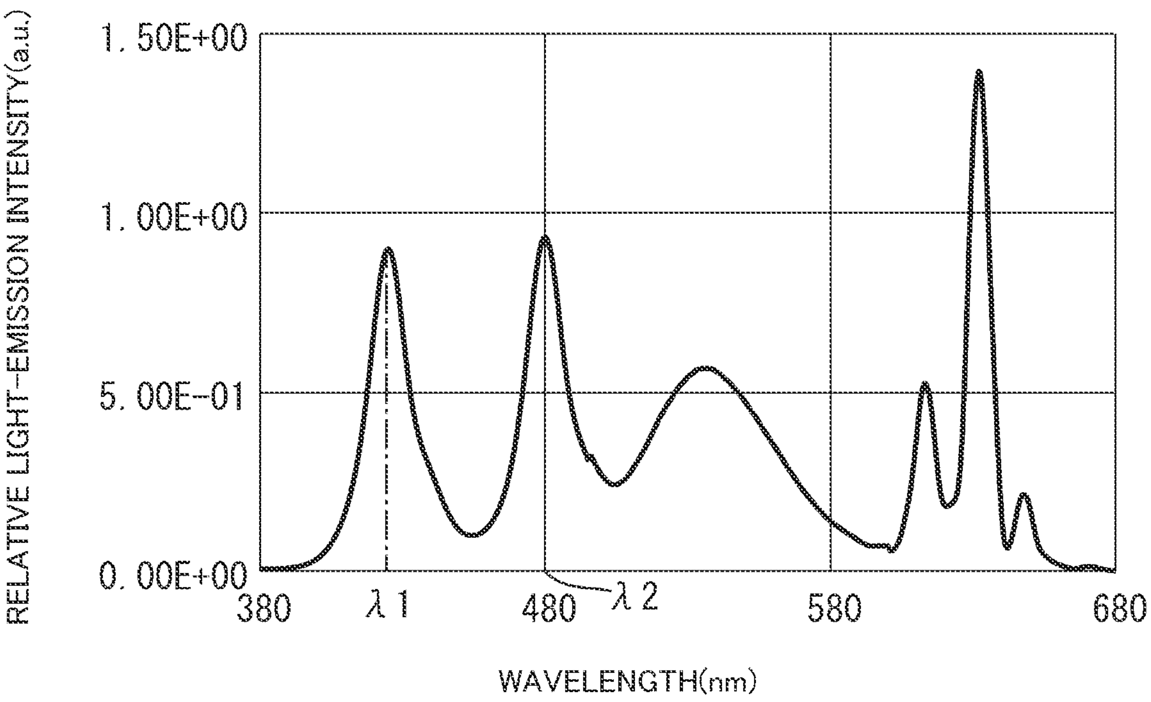
FIG. 7 is a graph representing a light emission spectrum of an LED when the first LED element in accordance with Embodiment 1 produces the same amount of light as the second LED element in accordance with Embodiment 1.
Figure 8:
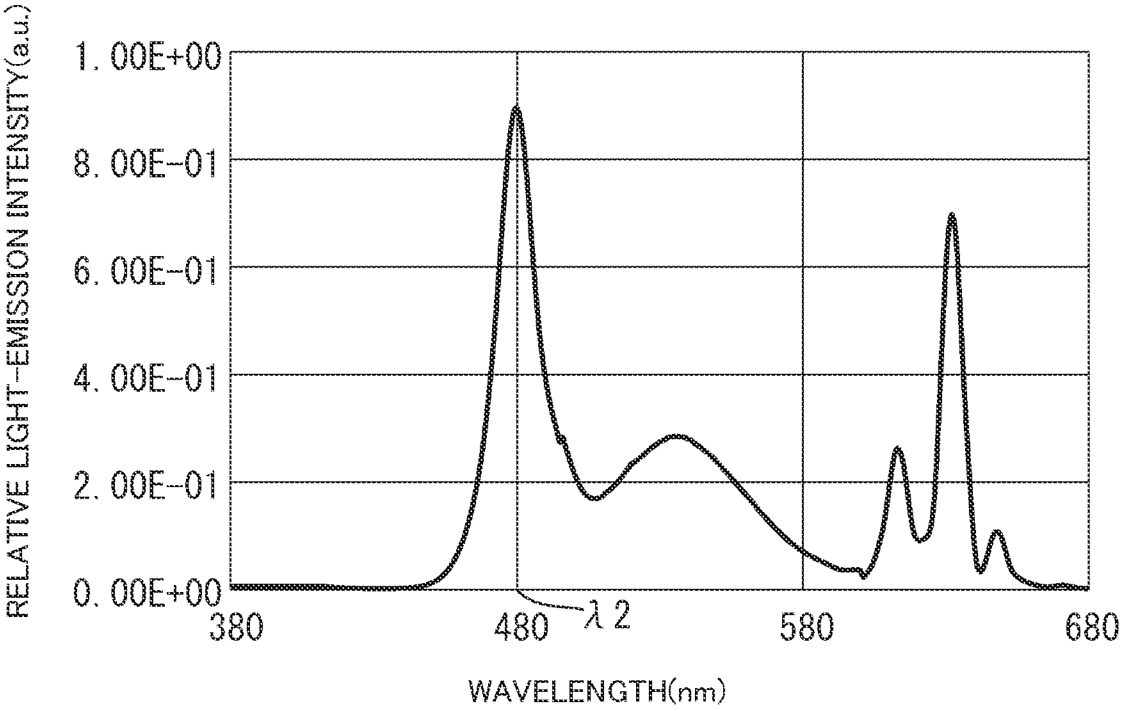
FIG. 8 is a graph representing a light emission spectrum of an LED when the second LED element in accordance with Embodiment 1 is turned on, and the first LED element in accordance with Embodiment 1 is turned off.

Specific examples of the light emission spectrum of the LED 15 is shown next in FIGS. 6 to 8. In FIGS. 6 to 8, the horizontal axis shows light wavelength (in nanometers), and the vertical axis shows relative light-emission intensity (no units). FIG. 6 shows the light emission spectrum of the LED 15 when the first LED element 20 is turned on and the second LED element 21 is turned off. In FIG. 6, the light-ON period is set to 100%, and the light-OFF period is set to 0%, in the first LED element 20, whereas the light-ON period is set to 0%, and the light-OFF period is set to 100%, in the second LED element 21. FIG. 7 shows the light emission spectrum of the LED 15 when the light-emission quantity of the first LED element 20 is equal to the light-emission quantity of the second LED element 21. In FIG. 7, the light-ON period is set to approximately 50%, and the light-OFF period is set to approximately 50%, in the first LED element 20, whereas the light-ON period is set to approximately 50%, and the light-OFF period is set to approximately 50%, in the second LED element 21. FIG. 8 shows the light emission spectrum of the LED 15 when the second LED element 21 is turned on and the first LED element 20 is turned off. In FIG. 8, the light-ON period is set to 0%, and the light-OFF period is set to 100%, in the first LED element 20, whereas the light-ON period is set to 100%, and the light-OFF period is set to 0%, in the second LED element 21.

FIG. 6 demonstrates that blue light with a peak wavelength of 425 nm, which is in the blue wavelength region, is discharged when only the first LED element 20 is turned on. FIG. 7 demonstrates that blue light with two peak wavelengths of 425 nm and 480 nm, which are in the blue wavelength region, is discharged when both the first LED element 20 and the second LED element 21 are turned on. FIG. 7 demonstrates that the sum of the two peak intensities in the blue wavelength region is greater than the peak intensity in the red wavelength region although the individual values of the two peak intensities in the blue wavelength region are smaller than the peak intensity in the red wavelength region. FIG. 8 demonstrates that blue light with a primary emission wavelength of 480 nm, which is in the blue wavelength region, is discharged when only the second LED element 21 is turned on. From FIGS. 6 to 8, it is understood that the blue light emission spectrum becomes controllable by suitably adjusting, for example, the light-emission quantity of each of the first LED element 20 and the second LED element 21 through the use of the LED control circuit.

As described above, the LED 15 in accordance with the present embodiment includes the two LED elements 20, 21, which have different primary emission wavelengths. Therefore, when both the two LED elements 20, 21 are turned on to emit light, difference may develop between the color tone produced by adding and mixing the blue light emitted by the first LED element 20 and the green and red light produced by the wavelength-conversion by the first wavelength conversion portion 25 and the color tone produced by adding and mixing the blue light emitted by the second LED element 21 and the green and red light produced by the wavelength-conversion by the second wavelength conversion portion 26, and the difference could be visually recognized as "color irregularities" where the color tones appear separated. In particular, in the present embodiment, since the LEDs 15 are used in the backlight device 12, which is of an edge-lit type, these color irregularities will become easily recognizable when the backlight device 12 is manufactured with an increasingly narrower frame.

Accordingly, as illustrated in FIG. 5, the first wavelength conversion portion 25 and the second wavelength conversion portion 26 in accordance with the present embodiment are configured to differ from each other in the ratio of the first green fluorescent material 25A, the first red fluorescent material 25B, the second green fluorescent material 26A, and the second red fluorescent material 26B contained therein. In other words, by adjusting the ratio of the first green fluorescent material 25A, the first red fluorescent material 25B, the second green fluorescent material 26A, and the second red fluorescent material 26B to differ between the first wavelength conversion portion 25 and the second wavelength conversion portion 26, the difference between the color tone produced by adding and mixing the blue light (primary light) emitted by the first LED element 20 and the green and red light (secondary light) produced by the wavelength-conversion by the first wavelength conversion portion 25 and the color tone produced by adding and mixing the blue light emitted by the second LED element 21 and the green and red light produced by the wavelength-conversion by the second wavelength conversion portion 26 can be reduced. Hence, a difference in the primary emission wavelength between the first LED element 20 and the second LED element 21 is less likely to allow for a color tone difference that is visually recognized as "color irregularities". In particular, in the edge-lit-type backlight device 12 including such LEDs 15, the color irregularities will suitably become less visually recognizable even when the backlight device 12 is manufactured with an increasingly narrower frame. Hence, the display quality is improved of the image displayed on the liquid crystal panel 11 in the liquid crystal display device 10.

More specifically, the quantity of the first green fluorescent material 25A and the first red fluorescent material 25B contained in the first sealing portion 23 is greater than the quantity of the second green fluorescent material 26A and the second red fluorescent material 26B contained in the second sealing portion 24, as shown in FIG. 5. This configuration renders the green and red light produced by the wavelength-conversion by the first green fluorescent material 25A and the first red fluorescent material 25B greater in quantity than the green and red light produced by the wavelength-conversion by the second green fluorescent material 26A and the second red fluorescent material 26B. This means that the portion of the blue light emitted by the first LED element 20 that is not wavelength-converted by the first wavelength conversion portion 25 is rendered smaller in quantity than the portion of the blue light emitted by the second LED element 21 that is not wavelength-converted by the second wavelength conversion portion 26. Therefore, when the quantity of the first green fluorescent material 25A and the first red fluorescent material 25B contained in the first sealing portion 23 is increased, the color tone produced by adding and mixing the blue light emitted by the first LED element 20 and the green and red light produced by the wavelength-conversion by the first wavelength conversion portion 25 tends to have a progressively decreasing blue color tone and progressively increasing green and red color tones. By adjusting the quantity of the first green fluorescent material 25A and the first red fluorescent material 25B contained in the first sealing portion 23 to be greater than the quantity of the second green fluorescent material 26A and the second red fluorescent material 26B contained in the second sealing portion 24 based on such a tendency, the difference that can develop between the color tone produced by adding and mixing the blue light emitted by the first LED element 20 and the green and red light produced by the wavelength-conversion by the first wavelength conversion portion 25 and the color tone produced by adding and mixing the blue light emitted by the second LED element 21 and the green and red light produced by the wavelength-conversion by the second wavelength conversion portion 26 can be suitably reduced.

Specifically, the concentration of the first green fluorescent material 25A and the first red fluorescent material 25B in the first sealing portion 23 is equal to the concentration of the second green fluorescent material 26A and the second red fluorescent material 26B in the second sealing portion 24 as shown in FIG. 5. In other words, the first wavelength conversion portion 25 and the second wavelength conversion portion 26 contain the first green fluorescent material 25A, the first red fluorescent material 25B, the second green fluorescent material 26A, and the second red fluorescent material 26B in the same ratio. This means that the quantity of the first green fluorescent material 25A and the first red fluorescent material 25B contained in unit volume of the first sealing portion 23 is equal to the quantity of the second green fluorescent material 26A and the second red fluorescent material 26B contained in unit volume of the second sealing portion 24. Then, the fill amount of the first sealing portion 23 in the housing portion 22 is greater than the fill amount of the second sealing portion 24. In the present embodiment, since the volumes of the first space S1 and the second space S2 in the housing portion 22 are approximately equal, the first sealing portion 23 in the first space S1 is higher than the second sealing portion 24 in the second space S2 of the housing portion 22. This configuration renders the ratio of the quantity of the first green fluorescent material 25A and the first red fluorescent material 25B contained in the first sealing portion 23 and the quantity of the second green fluorescent material 26A and the second red fluorescent material 26B contained in the second sealing portion 24 readily adjustable through the adjustment of the fill amount of each of the first sealing portion 23 and the second sealing portion 24. Since the concentration of the first green fluorescent material 25A and the first red fluorescent material 25B in the first sealing portion 23 is equal to the concentration of the second green fluorescent material 26A and the second red fluorescent material 26B in the second sealing portion 24, the first sealing portion 23 and the second sealing portion 24 may be made of a common material. Hence, the materials for the first sealing portion 23 and the second sealing portion 24 are easily manageable, and procurement costs can be reduced.

Figure 9:
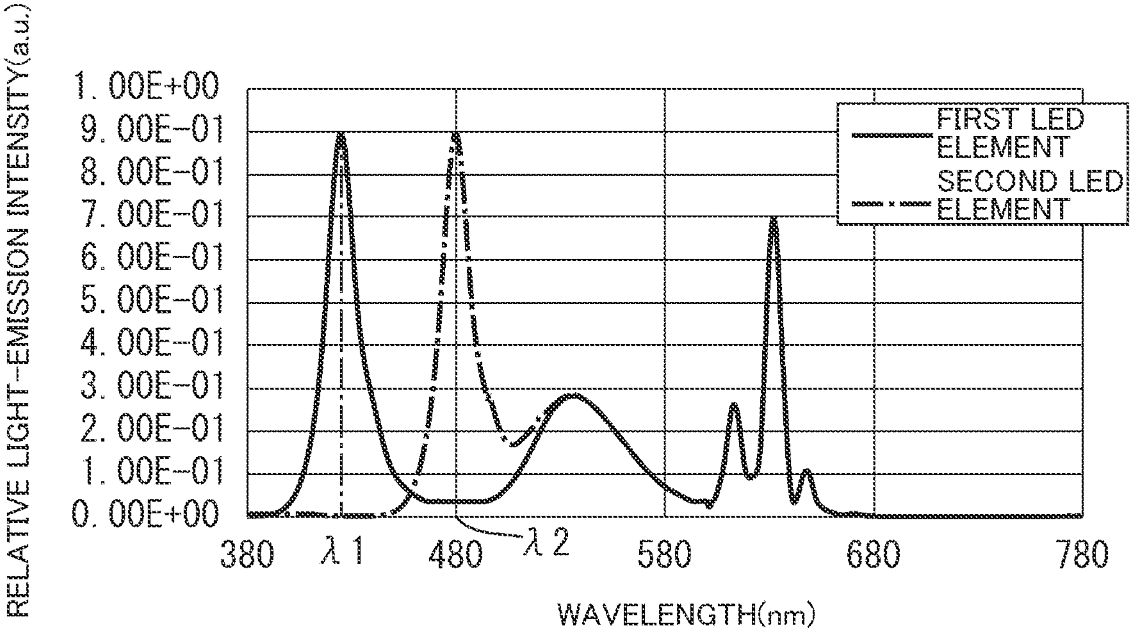
FIG. 9 is a graph representing a light emission spectrum of the first LED element and the second LED element, showing results of an experiment of Comparative Example 1 of Verification Experiment 1 in accordance with Embodiment 1.
Figure 10:
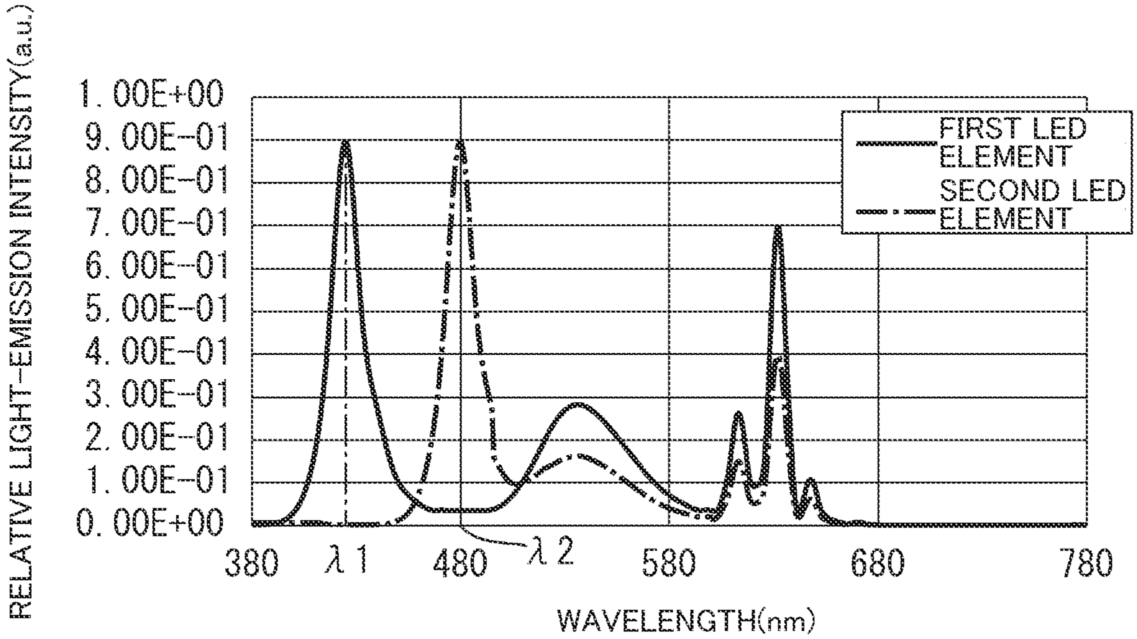
FIG. 10 is a graph representing a light emission spectrum of the first LED element and the second LED element, showing results of an experiment of Example 1 of Verification Experiment 1 in accordance with Embodiment 1.

Next, Verification Experiment 1 was performed to verify the relationship between the quantity of the first green fluorescent material 25A and the first red fluorescent material 25B contained in the first wavelength conversion portion 25 and the amount of the green and red light produced by the wavelength-conversion by the first wavelength conversion portion 25. In Verification Experiment 1, the LED in which the quantity of the first green fluorescent material 25A and the first red fluorescent material 25B contained was equal to the quantity of the second green fluorescent material 26A and the second red fluorescent material 26B contained was used in Comparative Example 1, and the LED 15 in which the quantity of the first green fluorescent material 25A and the first red fluorescent material 25B contained was greater than the quantity of the second green fluorescent material 26A and the second red fluorescent material 26B contained was used in Example 1. The LEDs of Comparative Example 1 and Example 1 had the structure described in the foregoing paragraphs, except for the quantity of the first green fluorescent material 25A, the first red fluorescent material 25B, the second green fluorescent material 26A, and the second red fluorescent material 26B contained. In Example 1, the quantity of the second green fluorescent material 26A and the second red fluorescent material 26B contained was approximately 1.73 times the quantity of the first green fluorescent material 25A and the first red fluorescent material 25B contained. In addition, the quantity of the second green fluorescent material 26A and the second red fluorescent material 26B contained in Comparative Example 1 was equal to the quantity of the second green fluorescent material 26A and the second red fluorescent material 26B contained in Example 1. In Verification Experiment 1, the light emission spectra of the LED of Comparative Example 1 and the LED 15 of Example 1 were measured both when only the first LED element 20 was turned on to emit light and when only the second LED element 21 was turned on to emit light. Results of the experiments are shown in FIGS. 9 and 10. FIG. 9 shows the light emission spectrum of the LED of Comparative Example 1. FIG. 10 shows the light emission spectrum of the LED 15 of Example 1. In FIGS. 9 and 10, the horizontal axis shows light wavelength (in nanometers), and the vertical axis shows relative light-emission intensity (no units). FIGS. 9 and 10 show both a light emission spectrum when only the first LED element 20 was turned on to emit light and a light emission spectrum when only the second LED element 21 was turned on to emit light. FIGS. 9 and 10 indicate the light emission spectrum of the first LED element 20 by a solid line and the light emission spectrum of the second LED element 21 by a dash-dot line. Note that FIGS. 9 and 10 are normalized so that the peak intensity of the first wavelength λ1 in the light emission spectrum of the first LED element 20 and the peak intensity of the second wavelength λ2 in the light emission spectrum of the second LED element 21 are equal to each other at approximately 0.896.

FIG. 9 demonstrates that in Comparative Example 1 in which the first green fluorescent material 25A, the first red fluorescent material 25B, the second green fluorescent material 26A, and the second red fluorescent material 26B were contained in equal quantities, the amount of the green and red light produced by the wavelength-conversion by the first wavelength conversion portion 25 was approximately equal to the amount of the green and red light produced by the wavelength-conversion by the second wavelength conversion portion 26. FIG. 10 demonstrates that in Example 1 in which the quantity of the first green fluorescent material 25A and the first red fluorescent material 25B contained was greater than the quantity of the second green fluorescent material 26A and the second red fluorescent material 26B contained, the amount of the green and red light produced by the wavelength-conversion by the first wavelength conversion portion 25 was greater than the amount of the green and red light produced by the wavelength-conversion by the second wavelength conversion portion 26. As described here, there is a correlation between the quantity of the first green fluorescent material 25A, the first red fluorescent material 25B, the second green fluorescent material 26A, and the second red fluorescent material 26B contained and the amount of the green and red light produced by the wavelength-conversion by the first wavelength conversion portion 25 and the second wavelength conversion portion 26.

Figure 11:
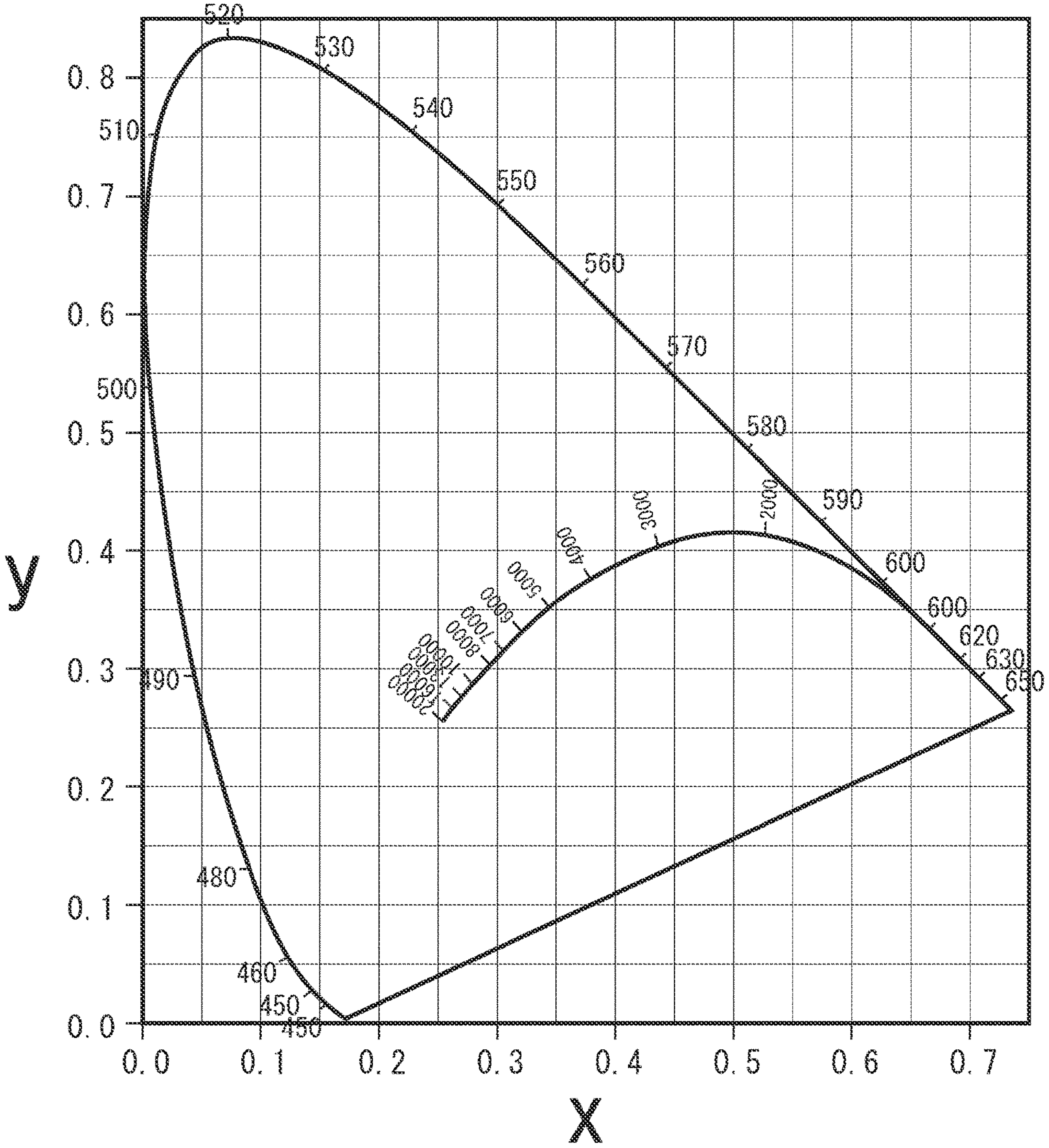
FIG. 11 is a CIE 1931 chromaticity diagram showing a black body locus and color temperature in accordance with Embodiment 1.

Subsequently, Verification Experiment 2 detailed below was performed to look into changes in chromaticity of light emission that are caused by changes in the quantity of the first green fluorescent material 25A and the first red fluorescent material 25B contained. In Verification Experiment 2, the quantity of the second green fluorescent material 26A and the second red fluorescent material 26B contained was fixed, whereas the quantity of the first green fluorescent material 25A and the first red fluorescent material 25B contained was varied. Specifically, the quantity ratio was equal to 1 in Comparative Example 1, 1.1 in Example 2, 1.73 in Example 1, 2.98 in Comparative Example 2, and 3 in Comparative Example 3, where the quantity ratio is defined as the ratio of the quantity of the first green fluorescent material 25A and the first red fluorescent material 25B contained to the quantity of the second green fluorescent material 26A and the second red fluorescent material 26B contained. Of these, Comparative Example 1 was the same as Comparative Example 1 described in Verification Experiment 1, and Example 1 was the same as Example 1 described in Verification Experiment 1. In all Comparative Examples 1 to 3 and Examples 1, 2, the quantity of the second green fluorescent material 26A and the second red fluorescent material 26B contained was equal, and the value of x and the value of y related to the chromaticity achieved when only the second LED element 21 was turned on to emit light were adjusted to be (0.283, 0.297). The chromaticity produced when only the second LED element 21 was turned on to emit light matched the chromaticity at which the color temperature was equal to 9300 K. FIG. 11 reproduces the CIE (Commission Internationale de l'Eclairage, or International Commission on Illumination) 1931 chromaticity diagram for reference. FIG. 11 shows the black body locus along with the color temperature. In FIG. 11, the x-axis, which is the horizontal axis, and the y-axis, which is the vertical axis, show the value of x and the value of y respectively that are chromaticity coordinate values.

Figures 12, 13:
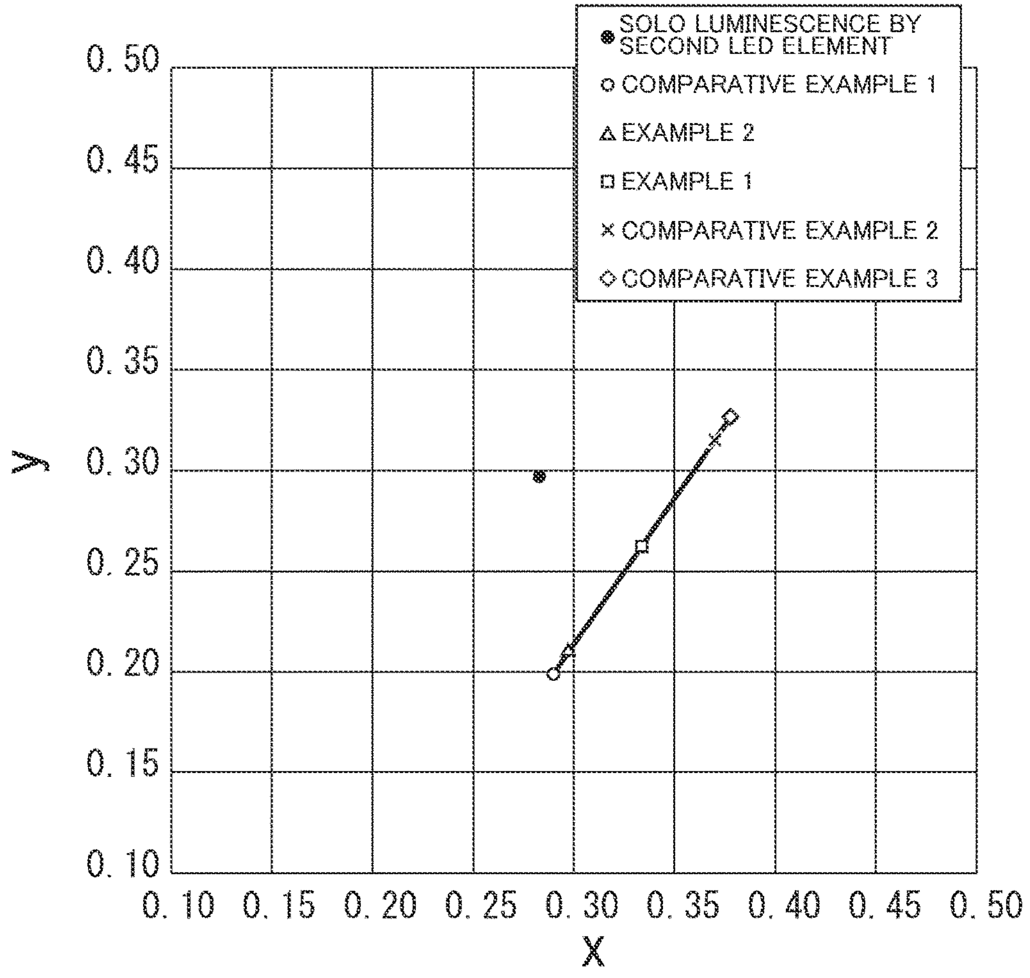
FIG. 12 is a CIE 1931 chromaticity diagram showing results of Verification Experiment 2 in accordance with Embodiment 1.
FIG. 13 is a table showing results of Verification Experiment 2 in accordance with Embodiment 1.

Then, in Verification Experiment 2, chromaticity was measured when only the first LED elements 20 of Comparative Examples 1 to 3 and Examples 1, 2 were turned on to emit light. Measurements are shown in FIGS. 12 and 13. FIG. 12 is a CIE 1931 chromaticity diagram showing results of the experiment conducted in Verification Experiment 2. In FIG. 12, the x-axis, which is the horizontal axis, and the y-axis, which is the vertical axis, show the value of x and the value of y respectively. In Verification Experiment 2, the chromaticity produced when only the second LED element 21 of Comparative Examples 1 to 3 and Examples 1, 2 was turned on to emit light and the chromaticity produced when only the first LED element 20 of Comparative Examples 1 to 3 and Examples 1, 2 was turned on to emit light were plotted on the CIE 1931 chromaticity diagram, and the distance between these two chromaticity values was calculated. FIG. 13 is a table showing results of experimentation, for example, the chromaticity produced when only the LED elements 20, 21 of Comparative Examples 1 to 3 and Examples 1, 2 were turned on to emit light and the distance between the two chromaticity values described above. FIG. 13 shows, in the entries thereof, the ratio of the quantity of the first green fluorescent material 25A and the first red fluorescent material 25B contained to the quantity of the second green fluorescent material 26A and the second red fluorescent material 26B contained as the "QUANTITY RATIO," the LED element that was turned on alone to emit light as "SOLO LUMINESCENCE," the value of x related to the chromaticity measurement as the "VALUE OF x," the value of y related to the chromaticity measurement as the "VALUE OF y," and the distance between the chromaticity produced when only the second LED element 21 was turned on to emit light and the chromaticity produced when only the first LED element 20 was turned on to emit light as "DISTANCE."

FIGS. 12 and 13 demonstrate that both the value of x and the value of y related to chromaticity tended to increase with an increase from 1 in the quantity ratio. In other words, FIGS. 12 and 13 demonstrate that the blue color tone tended to decrease, and the green and red color tones tended to increase with an increase from 1 in the quantity ratio. The distance between the chromaticity produced when only the second LED element 21 was turned on to emit light and the chromaticity produced when only the first LED element 20 was turned on to emit light tended to gradually decrease with an increase from 1 in the quantity ratio, reach a minimum when the quantity ratio was equal to 1.73, and gradually increase with an increase from 1.73 in the quantity ratio. In Comparative Example 1 where the quantity ratio was set to 1, the distance between the chromaticity produced when only the second LED element 21 was turned on to emit light and the chromaticity produced when only the first LED element 20 was turned on to emit light was set to approximately 0.09865. The distance described above was set to the same value in Comparative Example 2 where the quantity ratio was set to 2.98 as in Comparative Example 1. Therefore, it is understood that as long as 1<Quantity Ratio<2.98, the distance described above is smaller than in Comparative Example 1, and the color tone difference is suppressed between the chromaticity produced when only the second LED element 21 is turned on to emit light and the chromaticity produced when only the first LED element 20 is turned on to emit light. Then, it is understood that in Example 1 where the quantity ratio is set to 1.73, the distance described above is set to a minimum of approximately 0.06151, and the color tone difference is most suppressed between the chromaticity produced when only the second LED element

21 is turned on to emit light and the chromaticity produced when only the first LED element 20 is turned on to emit light.

As described above, the LED (light source) 15 in accordance with the present embodiment includes: the first LED element (first light-emitting element) 20 with a primary emission wavelength equal to the first wavelength λ1 in the blue wavelength region; the second LED element (second light-emitting element) 21 with a primary emission wavelength equal to the second wavelength λ2 in the blue wavelength region, the second wavelength λ2 being longer than the first wavelength λ1; the first wavelength conversion portion 25 disposed on the light-exiting side of the first LED element 20; and the second wavelength conversion portion 26 disposed on the light-exiting side of the second LED element 21, wherein the first wavelength conversion portion 25 includes: the first green fluorescent material 25A for wavelength-converting the light emitted by the first LED element 20 to green light in the green wavelength region; and the first red fluorescent material 25B for wavelength-converting the light emitted by the first LED element 20 to red light in the red wavelength region, the second wavelength conversion portion 26 includes: the second green fluorescent material 26A for wavelength-converting the light emitted by the second LED element 21 to green light; and the second red fluorescent material 26B for wavelength-converting the light emitted by the second LED element 21 to red light, and the first wavelength conversion portion 25 and the second wavelength conversion portion 26 differ in either one or both of the quantity and composition of the first green fluorescent material 25A, the first red fluorescent material 25B, the second green fluorescent material 26A, and the second red fluorescent material 26B.

The blue light in the blue wavelength region emitted by the first LED element 20 is partially wavelength-converted to green light in the green wavelength region and red light in the red wavelength region by the first green fluorescent material 25A and the first red fluorescent material 25B in the first wavelength conversion portion 25. The blue light emitted by the second LED element 21 is partially wavelength-converted to green and red light by the second green fluorescent material 26A and the second red fluorescent material 26B in the second wavelength conversion portion 26. The first LED element 20 emits blue light with a primary emission wavelength equal to the first wavelength λ1 in the blue wavelength region, and the second LED element 21 emits blue light with a primary emission wavelength equal to the second wavelength λ2 in the blue wavelength region. Since the second wavelength λ2 is longer than the first wavelength λ1, light that is adapted circadian rhythms can be discharged by suitably adjusting the light-emission quantity of the first LED element 20 and the light-emission quantity of the second LED element 21. Meanwhile, a difference in the primary emission wavelength between the first LED element 20 and the second LED element 21 is less likely to allow for an undesirable color tone difference that may be easily visually recognized.

In this regard, the first wavelength conversion portion 25 and the second wavelength conversion portion 26 differ in either one or both of the quantity and composition of the first green fluorescent material 25A, the first red fluorescent material 25B, the second green fluorescent material 26A, and the second red fluorescent material 26B. In other words, through the adjustment such that the first wavelength conversion portion 25 and the second wavelength conversion portion 26 differ in either one or both of the quantity and composition of the first green fluorescent material 25A, the first red fluorescent material 25B, the second green fluorescent material 26A, and the second red fluorescent material 26B, the difference can be reduced that could occur between the color tone produced by adding and mixing the blue light emitted by the first LED element 20 and the light produced by the wavelength-conversion by the first wavelength conversion portion 25 in the green to the red wavelength region and the color tone produced by adding and mixing the blue light emitted by the second LED element 21 and the light produced by the wavelength-conversion by the second wavelength conversion portion 26 in the green to the red wavelength region. Hence, a difference in the primary emission wavelength between the first LED element 20 and the second LED element 21 will become less visually recognizable as a color tone difference.

In addition, the quantity of the first green fluorescent material 25A and the first red fluorescent material 25B contained is greater than the quantity of the second green fluorescent material 26A and the second red fluorescent material 26B contained. This configuration renders the first green fluorescent material 25A and the first red fluorescent material 25B in the first wavelength conversion portion 25 wavelength-convert more light than do the second green fluorescent material 26A and the second red fluorescent material 26B in the second wavelength conversion portion 26. Hence, the difference can be suitably reduced that could occur between the color tone produced by adding and mixing the blue light emitted by the first LED element 20 and the light produced by the wavelength-conversion by the first wavelength conversion portion 25 in the green to the red wavelength region and the color tone produced by adding and mixing the blue light emitted by the second LED element 21 and the light produced by the wavelength-conversion by the second wavelength conversion portion 26 in the green to the red wavelength region.

In addition, the ratio of the quantity of the first green fluorescent material 25A and the first red fluorescent material 25B contained to the quantity of the second green fluorescent material 26A and the second red fluorescent material 26B contained is greater than 1 and smaller than 2.98. If this ratio is greater than 2.98, the color tone difference is greater than or appropriately equal to the case where the ratio is 1. In this regard, by setting the ratio to a value greater than 1 and smaller than 2.98, the color tone difference can be made smaller than the case where the ratio is 1.

Further included are: the housing portion 22 housing the first LED element 20 and the second LED element 21; the first sealing portion 23 for filling the housing portion 22 and hence sealing the first LED element 20; and the second sealing portion 24 for filling the housing portion 22 and hence sealing the second LED element 21, wherein the first wavelength conversion portion 25 is contained in the first sealing portion 23, and the second wavelength conversion portion 26 is contained in the second sealing portion 24. The first LED element 20 and the second LED element 21 housed in the housing portion 22 is sealed by the first sealing portion 23 and the second sealing portion 24 filling the housing portion 22. The blue light emitted by the first LED element 20 in the blue wavelength region is partially wavelength-converted to light in the green to the red wavelength region by the first wavelength conversion portion 25 included in the first sealing portion 23. The blue light emitted by the second LED element 21 in the blue wavelength region is partially wavelength-converted to light in the green to the red wavelength region by the second wavelength conversion portion 26 included in the second sealing portion 24.

In addition, the concentration of the first green fluorescent material 25A and the first red fluorescent material 25B in the first sealing portion 23 is equal to the concentration of the second green fluorescent material 26A and the second red fluorescent material 26B in the second sealing portion 24, and the fill amount of the first sealing portion 23 is greater than the fill amount of the second sealing portion 24. This configuration renders the quantity of the first green fluorescent material 25A and the first red fluorescent material 25B contained in the first sealing portion 23 greater than the quantity of the second green fluorescent material 26A and the second red fluorescent material 26B contained in the second sealing portion 24. Therefore, the first wavelength conversion portion 25 wavelength-converts more light than does the second wavelength conversion portion 26. Hence, the difference can be suitably reduced that could occur between the color tone produced by adding and mixing the blue light emitted by the first LED element 20 and the light produced by the wavelength-conversion by the first wavelength conversion portion 25 in the green to the red wavelength region and the color tone produced by adding and mixing the blue light emitted by the second LED element 21 and the light produced by the wavelength-conversion by the second wavelength conversion portion 26 in the green to the red wavelength region. In addition, since the concentration of the first green fluorescent material 25A and the first red fluorescent material 25B in the first sealing portion 23 is equal to the concentration of the second green fluorescent material 26A and the second red fluorescent material 26B in the second sealing portion 24, the first sealing portion 23 and the second sealing portion 24 may be made of a common material.

In addition, the housing portion 22 includes the partition wall 22C for dividing the first sealing portion 23 and the second sealing portion 24. The provision of the partition wall 22C prevents the first sealing portion 23 and the second sealing portion 24 from being mixed. Hence, for example, each quantity and each composition can be maintained in a suitable condition in the first wavelength conversion portion 25 included in the first sealing portion 23 and in the second wavelength conversion portion 26 included in the second sealing portion 24.

In addition, the first wavelength λ1 of the first LED element 20 is set to fall in a range of from 420 nm to 450 nm, and the second wavelength λ2 of the second LED element 21 is set to fall in a range of from 450 nm to 480 nm. Since the first wavelength λ1 is set greater than or equal to 420 nm as described here, the light emitted by the first LED element 20 does not contain high energy, ultraviolet light (HEV: high energy violet light) in comparison with when the first wavelength is set shorter than 420 nm, and for this reason, adverse effects on retina and other cells are suppressed. Since the first wavelength λ1 is set to fall in the range of from 420 nm to 450 nm, and the second wavelength λ2 is set to fall in the range of from 450 nm to 480 nm, the secretion of melatonin can be suitably suppressed by not turning on the first LED element 20 to emit light, but turning on the second LED element 21 to emit light. On the other hand, the secretion of melatonin will unlikely be disturbed when the second LED element 21 is not turned on to emit light and the first LED element 20 is turned on to emit light. Therefore, for example, light that is adapted to human circadian rhythms can be produced by not turning on the first LED element 20 to emit light, but turning on the second LED element 21 to emit light in the morning and not turning on the second LED element 21 to emit light, but turning on the first LED element 20 to emit light at night.

In addition, the backlight device (lighting device) 12 in accordance with the present embodiment includes: the LEDs 15 described above; and the light-guide plate 17 and the optical sheets 19, which are optical members disposed on the light-exiting side of the LEDs 15 for imparting optical effects to the light emitted by the LEDs 15. According to such a backlight device 12, since the color tone difference in the light emitted by the LEDs 15 will become less visually recognizable, color irregularities will unlikely occur again in the light to which optical effects are imparted by the light-guide plate 17 and the optical sheets 19, both of which are an optical member.

In addition, the optical members include the light-guide plate 17 for guiding light from the LEDs 15, the light-guide plate 17 having the light-incident end face 17A opposite the light-emitting faces 15A of the LEDs 15, and the plurality of LEDs 15 are disposed next to each other along the light-incident end face 17A. The light discharged through the light-emitting faces 15A of the plurality of LEDs 15 and incident on the light-incident end face 17A of the light-guide plate 17 is guided inside the light-guide plate 17 and thereafter discharged from the light-guide plate 17. That the color tone difference becoming less visually recognizable in the light emitted by the LEDs 15 will unlikely cause color irregularities in the light discharged from the light-guide plate 17.

In addition, the liquid crystal display device (display device) 10 in accordance with the present embodiment includes: the backlight device 12 described above; and the liquid crystal panel (display panel) 11 for producing displays using the light from the backlight device 12. The liquid crystal display device 10 structured in this manner will unlikely cause color irregularities in the light projected by the backlight device 12 onto the liquid crystal panel 11, thereby achieving high display quality.

Embodiment 2

A description is given of Embodiment 2 with reference to FIGS. 14 to 17. In this Embodiment 2, the composition of a first wavelength conversion portion 125 and the composition of a second wavelength conversion portion 126 are changed. Note that no description will be repeated on the same structure, operation, and effects as those in foregoing Embodiment 1.

Referring to FIG. 14, an LED 115 in accordance with the present embodiment is configured such that the composition of a first green fluorescent material 125A, a first red fluorescent material 125B, a second green fluorescent material 126A, and a second red fluorescent material 126B differs between the first wavelength conversion portion 125 and the second wavelength conversion portion 126. More specifically, the ratio of the quantity of the first green fluorescent material 125A contained in the first wavelength conversion portion 125 to the quantity of the first red fluorescent material 125B contained in the first wavelength conversion portion 125 is greater than the ratio of the quantity of the second green fluorescent material 126A contained in the second wavelength conversion portion 126 to the quantity of the second red fluorescent material 126B contained in the second wavelength conversion portion 126. Conversely, the ratio of the quantity of the first red fluorescent material 125B contained in the first wavelength conversion portion 125 to the quantity of the first green fluorescent material 125A contained in the first wavelength conversion portion 125 is smaller than the ratio of the quantity of the second red fluorescent material 126B contained in the second wavelength conversion portion 126 to the quantity of the second green fluorescent material 126A contained in the second wavelength conversion portion 126.

This configuration renders the ratio of the amount of the green light produced by the wavelength-conversion by the first green fluorescent material 125A contained in the first wavelength conversion portion 125 to the amount of the red light produced by the wavelength-conversion by the first red fluorescent material 125B contained in the first wavelength conversion portion 125 (G/R ratio) greater than the ratio of the amount of the green light produced by the wavelength-conversion by the second green fluorescent material 126A contained in the second wavelength conversion portion 126 to the amount of the red light produced by the wavelength-conversion by the second red fluorescent material 126B contained in the second wavelength conversion portion 126. In other words, the configuration renders the ratio of the amount of the red light produced by the wavelength-conversion by the first red fluorescent material 125B contained in the first wavelength conversion portion 125 to the amount of the green light produced by the wavelength-conversion by the first green fluorescent material 125A contained in the first wavelength conversion portion 125 (R/G ratio) greater than the ratio of the amount of the red light produced by the wavelength-conversion by the second red fluorescent material 126B contained in the second wavelength conversion portion 126 to the amount of the green light produced by the wavelength-conversion by the second green fluorescent material 126A contained in the second wavelength conversion portion 126. Therefore, the green light and the red light produced by the wavelength-conversion by the first wavelength conversion portion 125 comes to have a more intense green color tone than the green light and the red light produced by the wavelength-conversion by the second wavelength conversion portion 126. Alternatively, the green light and the red light produced by the wavelength-conversion by the second wavelength conversion portion 126 may be described as coming to have a more intense red color tone than the green light and the red light produced by the wavelength-conversion by the first wavelength conversion portion 125. On the basis of such a tendency, through the adjustment such that the composition of the first wavelength conversion portion 125, in other words, the quantity ratio of the first green fluorescent material 125A and the first red fluorescent material 125B contained differs from the composition of the second wavelength conversion portion 126, in other words, the quantity ratio of the second green fluorescent material 126A and the second red fluorescent material 126B contained, the difference can be suitably reduced that could occur between the color tone produced by adding and mixing the blue light emitted by a first LED element 120 and the green and red light produced by the wavelength-conversion by the first wavelength conversion portion 125 and the color tone produced by adding and mixing the blue light emitted by a second LED element 121 and the green and red light produced by the wavelength-conversion by the second wavelength conversion portion 126. Hence, a difference in the primary emission wavelength between the first LED element 120 and the second LED element 121 is less likely to allow for a color tone difference that is visually recognized as “color irregularities.”

Referring to FIG. 14, in the present embodiment, the fill amount of a first sealing portion 123 and the fill amount of a second sealing portion 124 are equal in a housing portion 122. The manufacture of the LEDs 115 is facilitated by rendering the fill amount of the first sealing portion 123 and the fill amount of the second sealing portion 124 equal to each other as described here. In addition, the surface of the first sealing portion 123 and the surface of the second sealing portion 124 are flush with each other, thereby forming a single light-emitting face 115A of the LED 115. As described here, even if the fill amount of the first sealing portion 123 is equal to the fill amount of the second sealing portion 124, since the composition of the first green fluorescent material 125A, the first red fluorescent material 125B, the second green fluorescent material 126A, and the second red fluorescent material 126B differs between the first wavelength conversion portion 125 and the second wavelength conversion portion 126 as described above, the difference can be satisfactorily reduced that could occur between the color tone produced by adding and mixing the blue light emitted by the first LED element 120 and the green and red light produced by the wavelength-conversion by the first wavelength conversion portion 125 and the color tone produced by adding and mixing the blue light emitted by the second LED element 121 and the green and red light produced by the wavelength-conversion by the second wavelength conversion portion 126.

A description is now given of the composition pf the first green fluorescent material 125A, the first red fluorescent material 125B, the second green fluorescent material 126A, and the second red fluorescent material 126B in the first wavelength conversion portion 125 and the second wavelength conversion portion 126 by way of specific examples. In the LED 115 in accordance with the present embodiment, the composition of the first wavelength conversion portion 125 and the composition of the second wavelength conversion portion 126 are adjusted so that the first LED element 120 and the second LED element 121 share the same chromaticity x and y values of (0.283, 0.297) when turned on alone to emit light. In other words, the chromaticity produced when the first LED element 120 and the second LED element 121 are individually turned on alone to emit light matches the chromaticity at which the color temperature is equal to 9300 K.

FIG. 15 shows the light emission spectrum of the LED 115 in accordance with the present embodiment. In FIG. 15, the horizontal axis shows light wavelength (in nanometers), and the vertical axis shows relative light-emission intensity (no units). FIG. 15 shows a light emission spectrum when only the first LED element 120 is turned on to emit light and a light emission spectrum when only the second LED element 121 is turned on to emit light. FIG. 15 indicates the light emission spectrum of the first LED element 120 by a solid line and the light emission spectrum of the second LED element 121 by a dash-dot line. Note that FIG. 15 is normalized so that the peak intensity of the first wavelength $\lambda 1$ in the light emission spectrum of the first LED element 120 and the peak intensity of the second wavelength $\lambda 2$ in the light emission spectrum of the second LED element 121 are equal to each other at approximately 0.896. FIG. 15 shows that the blue light has a peak wavelength of 425 nm, the green light has a peak wavelength of 536 nm, and the red light has a peak wavelength of 632 nm when only the first LED element 120 is turned on to emit light. FIG. 15 also shows that the blue light has a peak wavelength of 480 nm, the green light has a peak wavelength of 536 nm, and the red light has a peak wavelength of 632 nm when only the second LED element 121 is turned on to emit light.

Figures 17, 18:
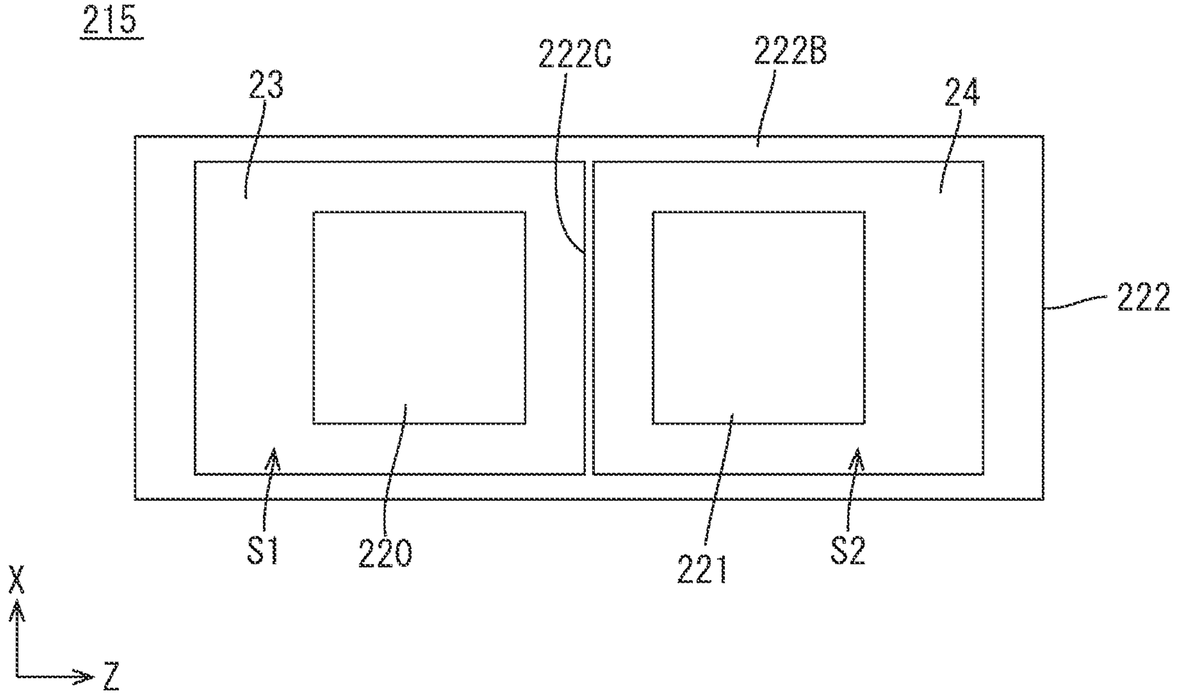
FIG. 17 is a table showing a G/R ratio an R/G ratio in accordance with Embodiment 2.
FIG. 18 is a front view of an LED in accordance with Embodiment 3.

The peak intensity of each of the blue light, the green light, and the red light is extracted from the light emission spectrum of the LED 115 shown in FIG. 15 and listed in the table of FIG. 16. FIG. 16 shows the peak intensity of the blue light, the peak intensity of the green light, and the peak intensity of the red light when the first LED element 120 and the second LED element 121 are individually turned on alone to emit light. The light peak intensity listed in FIG. 16 is a relative value with the peak intensity of the blue light being used as the reference (1.0). Specifically, the peak intensity of the green light listed in FIG. 16 is calculated by dividing the peak intensity of the green light related to the relative light-emission intensity shown in FIG. 15 by the peak intensity of the blue light related to the relative light-emission intensity shown in FIG. 15. Likewise, the peak intensity of the red light listed in FIG. 16 is calculated by dividing the peak intensity of the red light related to the relative light-emission intensity shown in FIG. 15 by the peak intensity of the blue light related to the relative light-emission intensity shown in FIG. 15. Furthermore, the ratio of the amount of the green light to the amount of the red light (G/R ratio) and the ratio of the amount of the red light to the amount of the green light (R/G ratio) when the first LED element 120 and the second LED element 121 are individually turned on alone to emit light are calculated and listed in the table of FIG. 17. The G/R ratio listed in FIG. 17 is calculated by dividing the peak intensity of the green light listed in FIG. 16 by the peak intensity of the red light listed in FIG. 16. The R/G ratio is calculated by dividing the peak intensity of the red light listed in FIG. 16 by the peak intensity of the green light listed in FIG. 16.

FIGS. 15 and 16 demonstrate that the peak intensity of the green light when only the first LED element 120 is turned on to emit light (0.32) is greater than the peak intensity of the green light when only the second LED element 121 is turned on to emit light (0.13). On the other hand, the peak intensity of the red light when only the first LED element 120 is turned on to emit light (0.58) is smaller than the peak intensity of the red light when only the second LED element 121 is turned on to emit light (0.69). The peak intensity of the green light is correlated with, for example, the quantity of the first green fluorescent material 125A and the second green fluorescent material 126A contained. The peak intensity of the red light is correlated with, for example, the quantity of the first red fluorescent material 125B and the second red fluorescent material 126B contained. Then, the G/R ratio when only the first LED element 120 is turned on to emit light (0.55) is greater than the G/R ratio when only the second LED element 121 is turned on to emit light (0.19). The R/G ratio when only the first LED element 120 is turned on to emit light (1.81) is smaller than the R/G ratio when only the second LED element 121 is turned on to emit light (5.31). The G/R ratio is correlated with, for example, the ratio of the quantity of the first green fluorescent material 125A contained to the quantity of the first red fluorescent material 125B contained and the ratio of the quantity of the second green fluorescent material 126A contained to the quantity of the second red fluorescent material 126B contained. The R/G ratio is correlated with, for example, the ratio of the quantity of the first red fluorescent material 125B contained to the quantity of the first green fluorescent material 125A contained and the ratio of the quantity of the second red fluorescent material 126B contained to the quantity of the second green fluorescent material 126A contained. Therefore, it is concluded that in the LED 115 in accordance with the present embodiment, the ratio of the quantity of the first green fluorescent material 125A contained to the quantity of the first red fluorescent material 125B contained is greater than the ratio of the quantity of the second green fluorescent material 126A contained to the quantity of the second red fluorescent material 126B contained.

As described above, according to the present embodiment, the ratio of the quantity of the first green fluorescent material 125A contained to the quantity of the first red fluorescent material 125B contained is greater than the ratio of the quantity of the second green fluorescent material 126A contained to the quantity of the second red fluorescent material 126B contained. This configuration renders the ratio of the amount of the green light produced by the wavelength-conversion by the first green fluorescent material 125A in the first wavelength conversion portion 125 to the amount of the red light produced by the wavelength-conversion by the first red fluorescent material 125B in the first wavelength conversion portion 125 is greater than the ratio of the amount of the green light produced by the wavelength-conversion by the second green fluorescent material 126A in the second wavelength conversion portion 126 to the amount of the red light produced by the wavelength-conversion by the second red fluorescent material 126B in the second wavelength conversion portion 126. Hence, the difference can be suitably reduced that could occur between the color tone produced by adding and mixing the blue light emitted by the first LED element 120 and the light in the green to the red wavelength region produced by the wavelength-conversion by the first wavelength conversion portion 125 and the color tone produced by adding and mixing the blue light emitted by the second LED element 121 and the light in the green to the red wavelength region produced by the wavelength-conversion by the second wavelength conversion portion 126.

In addition, the first wavelength conversion portion 125 and the second wavelength conversion portion 126 differ in the composition of the first green fluorescent material 125A, the first red fluorescent material 125B, the second green fluorescent material 126A, and the second red fluorescent material 126B, and the first sealing portion 123 and the second sealing portion 124 have an equal fill amount. The manufacture of the LEDs 115 is facilitated by rendering the fill amount of the first sealing portion 123 and the fill amount of the second sealing portion 124 equal to each other. Even when the first sealing portion 123 and the second sealing portion 124 have an equal fill amount, since the first wavelength conversion portion 125 and the second wavelength conversion portion 126 contained differ in the composition of the first green fluorescent material 125A, the first red fluorescent material 125B, the second green fluorescent material 126A, and the second red fluorescent material 126B, the difference can be satisfactorily reduced that could occur between the color tone produced by adding and mixing the blue light emitted by the first LED element 120 and the light in the green to the red wavelength region produced by the wavelength-conversion by the first wavelength conversion portion 125 and the color tone produced by adding and mixing the blue light emitted by the second LED element 121 and the light in the green to the red wavelength region produced by the wavelength-conversion by the second wavelength conversion portion 126.

Embodiment 3

A description is given of Embodiment 3 with reference to FIG. 18. In this Embodiment 3, the configuration of an LED 215 is changed from foregoing Embodiment 1. Note that no description will be repeated on the same structure, operation, and effects as those in foregoing Embodiment 1.

Referring to FIG. 18, in the LED 215 in accordance with the present embodiment, a partition wall 222C that is a part of a housing portion 222 is shaped like a flat plate extending in the shorter side direction (X-axis direction) of a peripheral wall 222B. The partition wall 222C connects to a pair of longer side portions of the peripheral wall 222B. The partition wall 222C partitions the internal space of the housing portion 222 into two spaces S1, S2 with respect to the longer side direction (Z-axis direction) of the peripheral wall 222B. Two LED elements 220, 221 are housed in the two spaces S1, S2 in the housing portion 222 partitioned by the partition wall 222C and arranged in the Z-axis direction. The two LED elements 220, 221 are both shaped like a rectangle that is close to a square. The LED 215 configured in this manner ensures a large dimension in the X-axis direction in each of the spaces S1, S2 and each of the LED elements 220, 221 in comparison with the LED 15 described in Embodiment 1, thereby being better suited to mass manufacturing.

Embodiment 4

Figure 19:
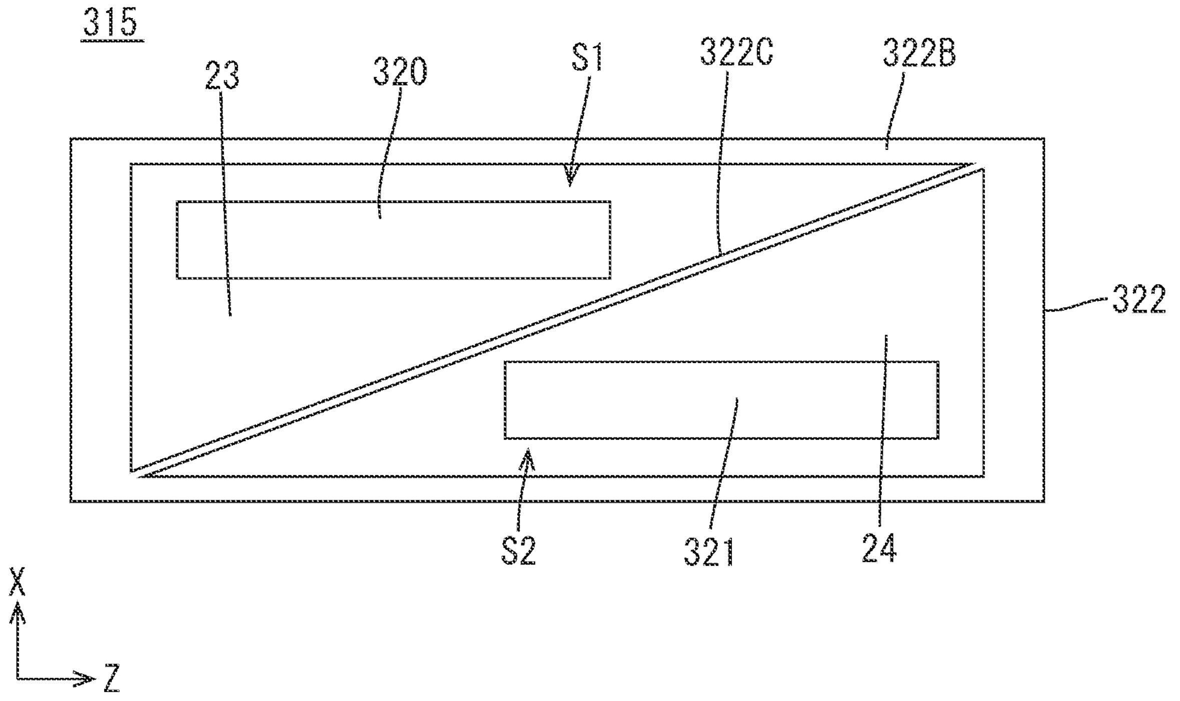
FIG. 19 is a front view of an LED in accordance with Embodiment 4.

A description is given of Embodiment 4 with reference to FIG. 19. In this Embodiment 4, the configuration of an LED 315 is changed from foregoing Embodiment 1. Note that no description will be repeated on the same structure, operation, and effects as those in foregoing Embodiment 1.

Referring to FIG. 19, in the LED 315 in accordance with the present embodiment, a partition wall 322C that is a part of a housing portion 322 is shaped like a flat plate extending in an oblique direction with respect to the longer side direction (Z-axis direction) and the shorter side direction (X-axis direction) of a peripheral wall 322B. The partition wall 322C extends along a diagonal of the peripheral wall 322B that is shaped like a rectangular frame elongated sideways in a plan view and connects to a pair of diagonally located corners of a peripheral wall 422B. The two spaces S1, S2, which are internal spaces of the housing portion 322 partitioned by such a partition wall 322C, are both shaped like a right triangle when viewed from a plane. Two LED elements 320, 321 housed in such spaces S1, S2 are both elongated sideways and disposed so that the lengthwise direction thereof matches the longer side direction of the peripheral wall 322B. The two LED elements 320, 321 are disposed so as to partially overlap each other with reference to the Z-axis direction. The LED 315 configured in this manner ensures a large dimension in the X-axis direction in each of the spaces S1, S2 in comparison with the LED 15 described in Embodiment 1, thereby being better suited to mass manufacturing.

Embodiment 5

Figure 20:
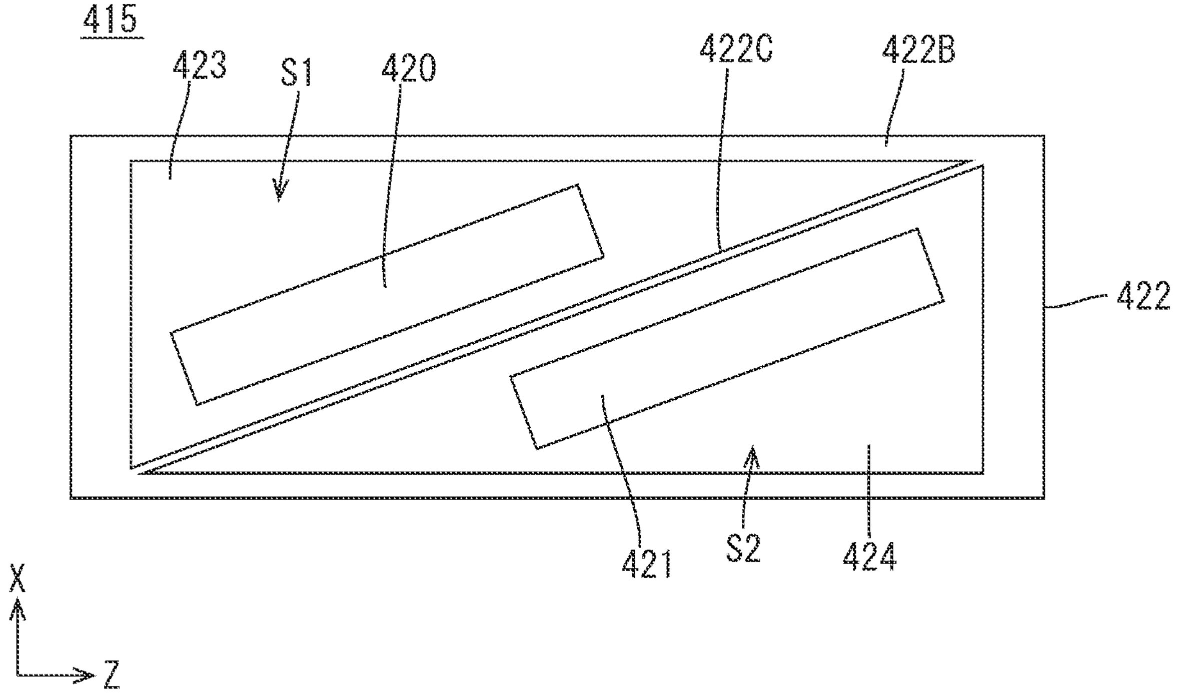
FIG. 20 is a front view of an LED in accordance with Embodiment 5.

A description is given of Embodiment 5 with reference to FIG. 20. In this Embodiment 5, the configuration of an LED 415 is changed from foregoing Embodiment 4. Note that no description will be repeated on the same structure, operation, and effects as those in foregoing Embodiment 1.

Referring to FIG. 20, the LED 415 in accordance with the present embodiment is configured such that the lengthwise direction of a first LED element 420 and a second LED element 421 is parallel to a partition wall 422C extending along a diagonal of the peripheral wall 422B. This configuration fixes both the gap between the first LED element 420 and the partition wall 422C and the gap between the second LED element 421 and the partition wall 422C. Therefore, the first LED element 420 and the second LED element 421 will unlikely interfere with the partition wall 422C when the first LED element 420 and the second LED element 421 are placed in a housing portion 422 in comparison with the layout in which the lengthwise direction of the first LED element and the second LED element is arranged parallel to the peripheral wall 422B as in foregoing Embodiments 1 to 4. The configuration is hence suitable in an attempt to reduce the size of the housing portion 422.

As described above, according to the present embodiment, the housing portion 422 includes: the bottom portion 22A (see FIG. 5) for supporting the partition wall 422C; and the peripheral wall 422B that rises from the bottom portion 22A to surround a first sealing portion 423 and a second sealing portion 424, wherein the peripheral wall 422B is shaped like a rectangular frame in a plan view, the partition wall 422C is provided extending along a diagonal of the peripheral wall 422B, and the first LED element 420 and the second LED element 421 are both elongated and disposed so as to have a lengthwise direction thereof parallel to the partition wall 422C. The first sealing portion 423 and the second sealing portion 424 respectively fill the two the spaces S1, S2 delimited by the bottom portion 22A, the peripheral wall 422B, and the partition wall 422C. Since the first LED element 420 and the second LED element 421, which are both elongated, are disposed so as to have a lengthwise direction thereof parallel to the partition wall 422C, the first LED element 420 and the second LED element 421 will unlikely interfere with the partition wall 422C when the first LED element 420 and the second LED element 421 are placed in the housing portion 422 in comparison with when the first LED element and the second LED element are tentatively arranged to have a lengthwise direction thereof parallel to the peripheral wall 422B. The configuration is hence suitable in an attempt to reduce the size of the housing portion 422.

OTHER EMBODIMENTS

The technology disclosed in the present specification is not necessarily limited to the foregoing description and embodiments described with reference to drawings. As an example, the following embodiments are also encompassed in the technical scope of the disclosure.

(1) The first wavelength conversion portion 25, 125 and the second wavelength conversion portion 26, 126 may differ from each other in both the quantity and composition of the first green fluorescent material 25A, 125A, the first red fluorescent material 25B, 125B, the second green fluorescent material 26A, 126A, and the second red fluorescent material 26B, 126B.

(2) In the configuration described in Embodiment 1, the chromaticity produced when only the second LED element 21 is turned on to emit light may be the chromaticity at which a color temperature other than 9300 K is achieved. In addition, the chromaticity produced when only the second LED element 21 is turned on to emit light may not be on the black body locus.

(3) In the configuration described in Embodiment 2, the chromaticity produced when the first LED element 120 and the second LED element 121 are individually turned on alone to emit light may be the chromaticity at which a color temperature other than 9300 K is achieved. In addition, the chromaticity produced when the first LED element 120 and the second LED element 121 are individually turned on alone to emit light may not be on the black body locus.

(4) In the configuration described in Embodiment 1, the fill amount of the first sealing portion 23 and the fill amount of the second sealing portion 24 may be rendered equal, and the concentration of the second green fluorescent material 26A and the second red fluorescent material 26B in the second sealing portion 24 may be greater than the concentration of the first green fluorescent material 25A and the first red fluorescent material 25B in the first sealing portion 23.

(5) In the configuration described in Embodiment 2, the quantity of the first green fluorescent material 125A, the first red fluorescent material 125B, the second green fluorescent material 126A, and the second red fluorescent material 126B contained in the first wavelength conversion portion 125 may be equal to the quantity of the first green fluorescent material 125A, the first red fluorescent material 125B, the second green fluorescent material 126A, and the second red fluorescent material 126B contained in the second wavelength conversion portion 126, whereas the first wavelength conversion portion 125 and the second wavelength conversion portion 126 have a different composition from each other.

(6) The configurations described in Embodiment 3, 4, 5 may be combined with the configuration described in Embodiment 2.

(7) The first wavelength λ1, which is the primary emission wavelength of the first LED element 20, 120, 220, 320, 420, may be varied in a suitable manner in the range of from 420 nm to 450 nm. Likewise, the second wavelength λ2, which is the primary emission wavelength of the second LED element 21, 121, 221, 321, 421, may be varied in a suitable manner in the range of from 450 nm to 480 nm. For example, the quantity and composition in the first wavelength conversion portion 25, 125 and the second wavelength conversion portion 26, 126 may be varied in a suitable manner in accordance with the numerical values of the first wavelength λ1 and the second wavelength λ2.

(8) The green fluorescent material 25A, 125A, 126A, 126A may be a material other than beta-SiAlON. Likewise, the red fluorescent material 25B, 125B, 26B, 126B may be a material other than potassium silicofluoride.

(9) The first green fluorescent material 25A, 125A and the second green fluorescent material 26A, 126A may be different materials. Likewise, the first red fluorescent material 25B, 125B may be a different material than the second red fluorescent material 26B, 126B.

(10) The spectrum shape related to the light emission spectrum of the LED 15, 115, 215, 315, 415 (first LED element 20, 120, 220, 320, 420 and second LED element 21, 121, 221, 321, 421) are as shown in drawings and may also be varied in a suitable manner.

(11) The LED 15, 115, 215, 315, 415 may include a plurality of first LED elements 20, 120, 220, 320, 420 and a plurality of second LED elements 21, 121, 221, 321, 421.

(12) The wavelength conversion portion 25, 125, 26, 126 may contain a yellow fluorescent material. The yellow fluorescent material wavelength-converts blue light to emit yellow light in a yellow wavelength region (approximately 580 nm to approximately 600 nm).

(13) As an example, the shape of the housing portion 22, 122, 222, 322, 422 of the LED 15, 115, 215, 315, 415 as viewed in a plane and the cross-sectional shape thereof may be varied in a suitable manner. For example, the housing portion 22, 122, 222, 322, 422 may be shaped like a square, a longitudinally elongated rectangle, a trapezoid, or a rhombus in a plan view. In addition, for example, the peripheral wall 22B, 222B, 322B, 422B of the housing portion 22, 122, 222, 322, 422 may have an inclined cross-sectional shape like a bugle.

(14) As a light source other than the LED 15, 115, 215, 315, 415, for example, an organic EL (electro luminescence) may be used.

(15) The backlight device 12 may be of a direct type as well as of an edge-lit type.

(16) The optical sheets 19 may be varied in, for example, number, type, and stacking order in a suitable manner.

(17) The liquid crystal panel 11 may be of a transflective type as well as of a transmissive type.

(18) The display mode of the liquid crystal panel 11 may be, for example, VA mode or IPS mode.

What is claimed is:

1. A light source comprising:

a first light-emitting element having a primary emission wavelength equal to a first wavelength that is in a blue wavelength region;

a second light-emitting element having a primary emission wavelength equal to a second wavelength that is in the blue wavelength region, the second wavelength being longer than the first wavelength;

a first wavelength conversion portion disposed on a light-exiting side of the first light-emitting element;

a second wavelength conversion portion disposed on a light-exiting side of the second light-emitting element;

a housing portion housing the first light-emitting element and the second light-emitting element;

a first sealing portion filling the housing portion to seal the first light-emitting element; and a second sealing portion filling the housing portion to seal the second light-emitting element, wherein the first wavelength conversion portion includes:

a first green fluorescent material configured to wavelength-convert light emitted by the first light-emitting element to green light in a green wavelength region; and a first red fluorescent material configured to wavelength-convert the light emitted by the first light-emitting element to red light in a red wavelength region, the second wavelength conversion portion includes:

a second green fluorescent material configured to wavelength-convert light emitted by the second light-emitting element to the green light; and a second red fluorescent material configured to wavelength-convert the light emitted by the second light-emitting element to the red light, the first wavelength conversion portion and the second wavelength conversion portion differ from each other in either one or both of a quantity and a composition of the first green fluorescent material, the first red fluorescent material, the second green fluorescent material, and the second red fluorescent material, the first wavelength conversion portion is contained in the first sealing portion, the second wavelength conversion portion is contained in the second sealing portion, the first sealing portion has a same concentration of the first green fluorescent material and the first red fluorescent material as the second sealing portion has a concentration of the second green fluorescent material and the second red fluorescent material, and the first sealing portion has a greater fill amount than the second sealing portion.

2. The light source according to claim 1, wherein a quantity of the first green fluorescent material and the first red fluorescent material is greater than a quantity of the second green fluorescent material and the second red fluorescent material.

3. The light source according to claim 2, wherein a ratio of the quantity of the first green fluorescent material and the first red fluorescent material to the quantity of the second green fluorescent material and the second red fluorescent material is greater than 1 and smaller than 2.98.

4. The light source according to claim 1, wherein the housing portion includes a partition wall dividing the first sealing portion and the second sealing portion.

5. The light source according to claim 1, wherein the first wavelength for the first light-emitting element is in a range of from 420 nm to 450 nm, and the second wavelength for the second light-emitting element is in a range of from 450 nm to 480 nm.

6. A lighting device comprising:

the light source according to claim 1; and an optical member disposed on a light-exiting side of the light source to impart an optical effect on light emitted by the light source.

7. The lighting device according to claim 6, wherein the optical member includes a light-guide plate having a light-incident end face opposite a light-emitting face of the light source, the light-guide plate being configured to guide the light emitted from the light source, and the light source comprises a plurality of light sources arranged along the light-incident end face.

8. A display device comprising:

the lighting device according to claim 6; and a display panel configured to produce a display by using light from the lighting device.

* * * * *